US010735365B2

(12) United States Patent
Diriye et al.

(10) Patent No.: US 10,735,365 B2
(45) Date of Patent: Aug. 4, 2020

(54) CONVERSATION ATTENDANT AND ASSISTANT PLATFORM

(71) Applicant: International Business Machines Corporation, Armonk, NY (US)

(72) Inventors: Abdigani Diriye, Nairobi (KE); Clifford A. Pickover, Yorktown Heights, NY (US); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 15/868,609

(22) Filed: Jan. 11, 2018

(65) Prior Publication Data

US 2019/0215288 A1 Jul. 11, 2019

(51) Int. Cl.
*H04L 12/58* (2006.01)
*G06N 3/04* (2006.01)
*G06N 3/08* (2006.01)

(52) U.S. Cl.
CPC .............. *H04L 51/18* (2013.01); *G06N 3/04* (2013.01); *G06N 3/08* (2013.01)

(58) Field of Classification Search
CPC ............. H04L 51/18; G06N 3/04; G06N 3/08
See application file for complete search history.

(56) References Cited

U.S. PATENT DOCUMENTS

| 6,542,889 | B1 | 4/2003 | Aggarwal et al. |
| 8,095,595 | B2 | 1/2012 | Bobbitt et al. |
| 8,626,832 | B2 | 1/2014 | Kieran et al. |
| 8,706,725 | B2 | 4/2014 | Bailey et al. |
| 8,825,511 | B2 | 9/2014 | Hamilton et al. |
| 8,849,356 | B2 | 9/2014 | Chi et al. |
| 8,938,463 | B1 | 1/2015 | Kim et al. |
| 9,135,320 | B2 | 9/2015 | Goyal et al. |
| 9,292,597 | B2 | 3/2016 | Luo et al. |
| 10,051,109 | B2 | 8/2018 | Jackson et al. |

(Continued)

OTHER PUBLICATIONS

Peter Mell and Timothy Grance, "The NIST Definition of Cloud Computing". NIST Special Publication 800-145. Sep. 2011, pp. 1-7.

(Continued)

*Primary Examiner* — Soe Hlaing
(74) *Attorney, Agent, or Firm* — Eyal Gilboa; Otterstedt, Wallace & Kammer, LLP

(57) ABSTRACT

A conversation attendant and assistant platform implements a method of receiving by a computer a plurality of messages in a plurality of conversations via one or more messaging applications. The platform tags each message of the plurality of messages with a message cohort and an amelioration action, and assigns a risk to the given message based on the message cohort. The platform also determines a user context of a user of the computer, and, in response to factors including the user context and the risk, assigns a concern level to the given message. The platform accumulates and summarizes the given message along with other messages in a conversation of the given message. In case the concern level exceeds a threshold, the platform selects one or more delivery channels for surfacing a summary of the conversation and surfaces the summary via the one or more delivery channels.

20 Claims, 19 Drawing Sheets

(56) References Cited

U.S. PATENT DOCUMENTS

| | | | |
|---|---|---|---|
| 2009/0043860 A1* | 2/2009 | Aoki | G06Q 10/107 |
| | | | 709/206 |
| 2010/0317371 A1 | 12/2010 | Westerinen et al. | |
| 2012/0023113 A1 | 1/2012 | Ferren et al. | |
| 2012/0124147 A1* | 5/2012 | Hamlin | H04L 51/36 |
| | | | 709/206 |
| 2013/0328665 A1* | 12/2013 | Cranfill | G06Q 10/109 |
| | | | 340/7.55 |
| 2014/0122626 A1 | 5/2014 | Alam | |
| 2014/0380489 A1 | 12/2014 | Hacid et al. | |
| 2015/0088574 A1 | 3/2015 | Libin et al. | |
| 2017/0038933 A1 | 2/2017 | Hoskins et al. | |
| 2017/0116337 A1 | 4/2017 | Creamer et al. | |

OTHER PUBLICATIONS

John E. Kelly III, "Computing, cognition, and the future of knowing", IBM Corp. Oct. 2015, pp. 1-11.

EireezeTree Software, "Flowchart Software | FlowBreeze by BreezeTree", http://www.breezetree.com/flowcharting-software/, accessed Aug. 18, 2017, pp. 1-8.

Wei Peng et al., "Mining the 'Voice of the Customer' for Business Prioritization," ACM Transactions on Intelligent Systems and Technology vol. 3(2), Feb. 2012, Article 38 pp. 1-17.

Anna Huang, "Similarity Measures for Text Document Clustering," NZCSRSC 2008, Apr. 2008, Christchurch, New Zealand. p. 49-56.

\* cited by examiner

CONVERSATION ATTENDANT AND ASSISTANT PLATFORM

BACKGROUND

The present invention relates to electronic communication, and more specifically, to messaging in a collaborative environment.

Online messaging applications and collaborative development environments are fundamentally changing the way people interact with one another, share information, and communicate. Applications (or apps) such as WHATSAPP, VIBER, SLACK, FACEBOOK MESSENGER, TRELLO, WECHAT, and VINE are a few of the present day examples of messaging applications found on many smartphones, tablets, and computers that offer messaging and facilitate electronic exchange of text, images, audio, and video. WHATSAPP is a trademark of WHATSAPP, Inc. VIBER is a trademark of Viber Media S.A.R.L. SLACK is a trademark of Slack Technologies, Inc. FACEBOOK MESSENGER is a trademark of Facebook, Inc. TRELLO is a trademark of Trello, Inc. WECHAT is a trademark of Tencent Holdings, Ltd. VINE is a trademark of Twitter, Inc.

Limitations in human attention may make it difficult for a user to keep abreast of all the notifications, messages, images, audio, and video that may be received, resulting in information overload. There may be serious implications as a result of such information overload. As an example, consider the scenario where a user is engaging with several messaging applications over a number of modalities, while also performing critical tasks in response to received messages. A deluge of messages and data can be difficult to keep abreast of and process. Vital information that may impact the user could be missed or overlooked.

Presently, a leading messaging application has over 1 billion monthly active users, and it has been reported that 6 out of the top 10 mobile apps are messaging apps. Messaging apps dominate other kinds of apps in terms of sessions. The "Slack" messaging application platform is changing how enterprises communicate, facilitating communication among teams into channels, where text-like messages can be viewed by all team members. In such collaborative environments where multiple and geographically dispersed teams work together, a user may easily be overloaded with information and content so as to be unable to prioritize or define needed actions. Such scenarios can lead to miscommunication, poor prioritization, and in some situations a deleterious impact on business operations.

SUMMARY

Principles of the invention provide techniques for a conversation attendant and assistant platform. In one aspect, an exemplary method includes receiving a plurality of messages in a plurality of conversations via one or more messaging applications. The exemplary method further includes tagging each message of the plurality of messages with a message cohort and an amelioration action. In response to the message cohort of a given message, the method includes assigning a risk to the given message. The method also includes determining a user context of a user of a computing device, and, in response to factors including the user context of the user and the risk of the given message, assigning a concern level to the given message. The method includes accumulating and summarizing the given message along with other messages in a conversation of the given message, and in case the concern level of the given message exceeds a threshold, selecting one or more delivery channels for surfacing a summary of the conversation of the given message and surfacing the summary via the one or more delivery channels.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Facilitating messaging in a collaborative environment by summarizing important messages and notifying a user of needed actions.

Facilitating conversation in a collaborative environment by analyzing, summarizing, and preserving contextualized information in a personalized manner.

Facilitating summarized delivery of messages from one or more conversations or discussions threads based on user-supplied context specification, predicted risk or concern level of a conversation/discussion, detected user context, etc.

These and other features and advantages of the present invention will become apparent from the following detailed description of illustrative embodiments thereof, which is to be read in connection with the accompanying drawings.

DETAILED DESCRIPTION

Figure 1:
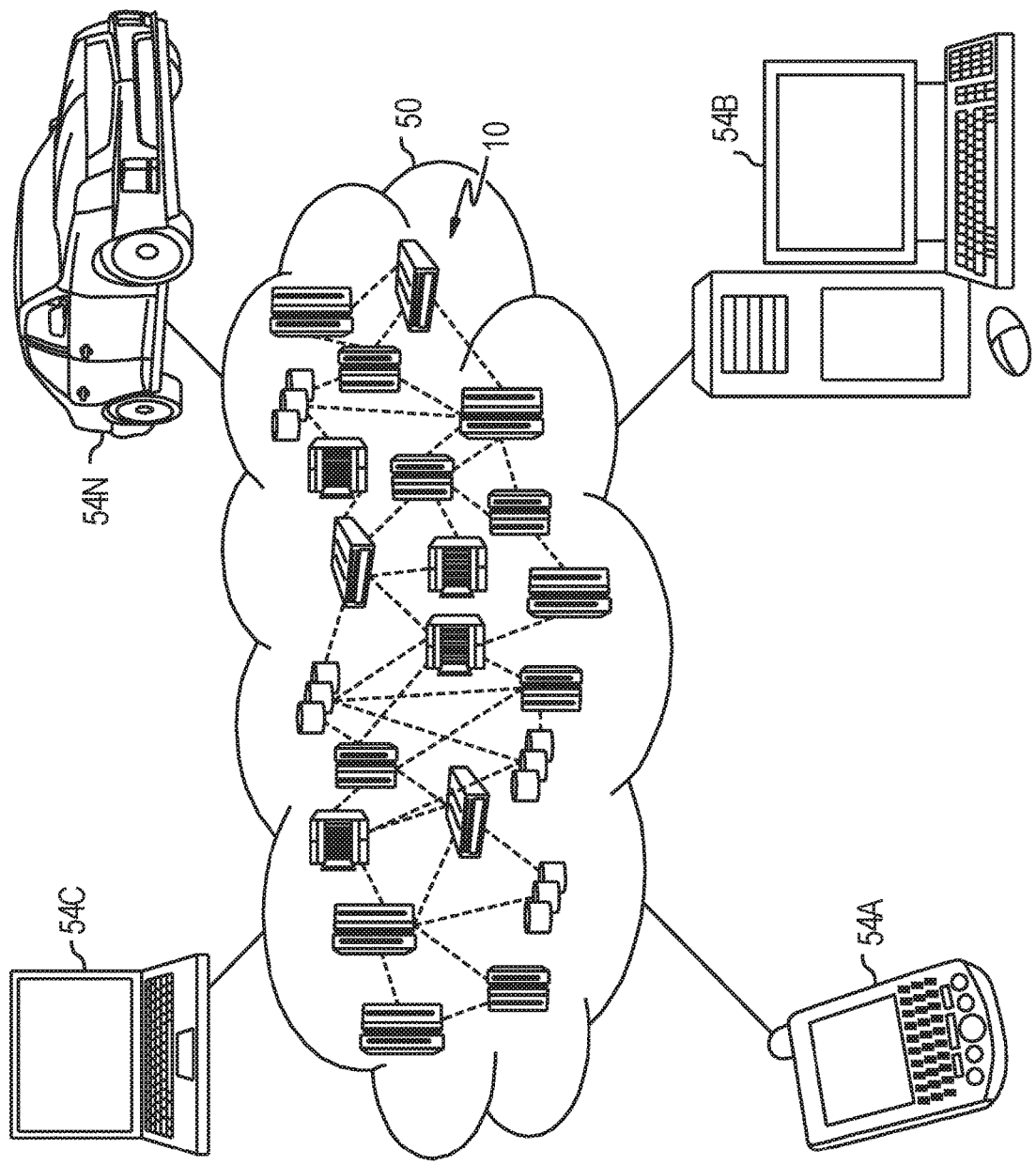
FIG. 1 depicts a cloud computing environment according to an exemplary embodiment of the invention.

It is to be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
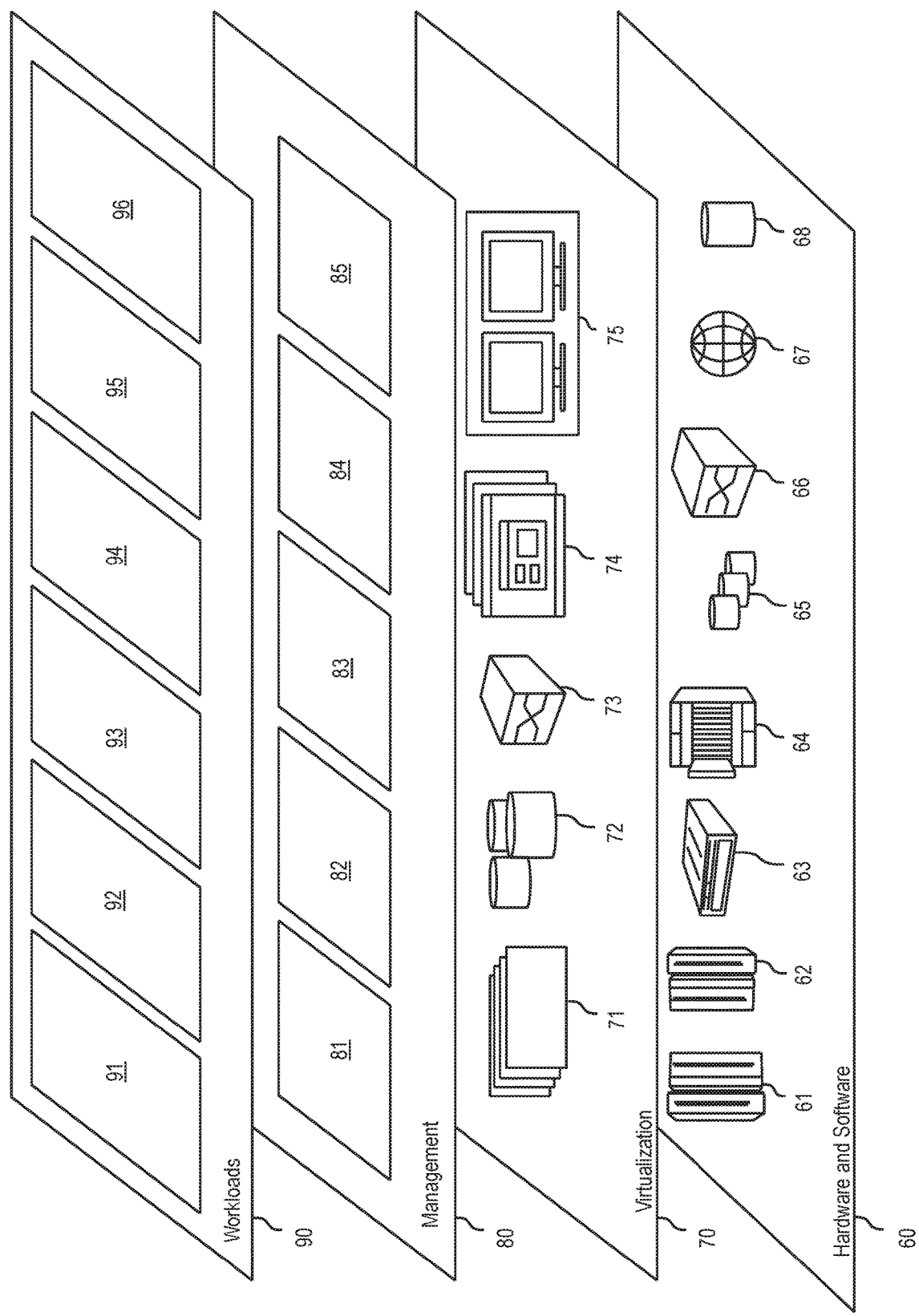
FIG. 2 depicts abstraction model layers according to an exemplary embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a conversation attendant and assistant platform 96.

In a collaborative messaging or discussion system according to an embodiment, messages in a conversation or discussion are processed according to one or more protocols in response to a value of a concern (or risk) level of the conversation or discussion exceeding a threshold and when a user context changes. For ease of describing the embodiments, the term "conversation" is used to include a conversation or discussion, or any such like collection of messages commonly used in a collaborative environment.

An embodiment includes a platform for facilitating a conversation in a collaborative software application development environment, and determines or predicts a value of a concern level associated with the conversation or discussion. The messages within the conversation may include text, images, video, or audio. As examples of a concern level, in the context of a conversation among software developers and managers, the value of a concern level may be indicative of a severity level, testing of development code, or integration development code.

An embodiment also determines or measures a user context, for example where a user context may indicate whether the user has not participated in the conversation for some time interval T, or whether the user is in a resource constrained area so that access to the conversation may be limited. If the value of a concern level exceeds a threshold, an embodiment summarizes one or more messages in the conversation and implements one or more actions, such as an amelioration action. The particular type of summarization, and the particular action, or actions, may depend upon various environmental variables related to the user context. An embodiment may optionally utilize various types of dynamic monitoring of a user context (perhaps indicative of the user's sentiment or emotions) associated with the conversation. For example, a user context may indicate that the user is travelling in a resource constrained situation or area (e.g., poor or limited network connectivity), where the ability of the user to stay active or connected is limited and or costly.

A system and method is described that provides a solution to address usability issues with existing messaging platforms and to ameliorate information overload. Messages may be personalized based on a concern level and user context, as well as the historic behavior of the user, such as for example the severity of the message, importance of the conversation, and frequency of user interaction. In addition to surfacing a specific notification to the user once the value of a concern level exceeds a threshold, an embodiment summarizes one or more messages from different individual or group conversations, sometimes referred to as channels.

With each notification or summarization, an embodiment may also recommend an action or a set of actions for the user to take. Thus, embodiments may employ various analytics models to identify information items in a discussion or conversation such as code, timelines, calendar, screen shots, videos, and then recommend useful next steps, e.g., insertions into a calendar, or changes in a software configuration management account (e.g. GitHub). Other examples include a request that the user view or respond to a message or summarized message, or that the user schedule an action or meeting. The scheduling may be done without action on the part of the user.

An embodiment may also include a risk-based scoring model to identify the importance of different messages and conversations, and the associated actions. A language model may be used to detect the severity and the required action. The conversations and messages may be labeled to indicate the concern level based on interests, interactions, and historical cohort. The labeling, for example, may include text, or shading or coloring of the message as it appears on a user device screen.

If the value of the concern level is greater than a threshold T, then an embodiment may take an action, such as an amelioration action. Examples of an action include an immediate action, an "FYI" (for your information), meeting/schedule, software amendment, and feedback.

An action may be an immediate action. For example, the action may be a request to the user to immediately view a sent message because that message is determined to be of high priority. Based upon the message sent, an embodiment may execute a specific action, such as software bug fixing, testing, or a change in deployment configuration, in the case of software development. Such actions may be transmitted to a device, such as a PC (Personal Computer) desktop, a mobile communication device, a laptop, a virtual reality device, or a voice service, such as, for example the Amazon Alexa intelligent personal assistant.

If the value of the concern level for a message exceeds a threshold T, but only by some specified small amount, then some embodiments may transmit contextual information that is important for the user to be aware of ("FYI"). For example, a reminder may be sent to the user device or email address.

An action may generate a calendar invitation or a request to reschedule a meeting. Such an action may be implemented if an embodiment detects in a message a request to arrange a meeting or to reschedule a meeting. In response, an embodiment generates a calendar invitation or request to reschedule a meeting.

In cases where an embodiment detects in a conversation specific feedback or comments on software development, an embodiment may provide a software amendment action by identifying the component requiring amendment, for example by identifying which module or component should be amended based on integration with source code repositories. Embodiments may determine what type of action should be performed, e.g., test, deploy, or fix.

In some cases, an embodiment may identify messages that request some kind of answer, response, or feedback. For example, messages that are directed at the user, or messages that are sent to a group that the user belongs to, may request an answer to some question. In response to such a message, an embodiment may provide the answer or feedback.

In another embodiment, for a user conversation or a discussion across multiple channels, events or messages for the user are tracked, stored, and managed in a user historic event blockchain. Blockchains may be associated with conversations or discussions, and blockchain transactions may be recorded through time for the respective conversation or channel. Also, the introduction of an invited user associated with the channel may apply blockchain-controlled conversations, wherein the conversation may be tagged, labeled, or predicted (e.g., as severe, critical, a complaint, or feedback) using the blockchain.

In one or more embodiments, analytics further enable actions, such as: drawing a flow chart related to a meeting, or drawing a picture or diagram; creating a short story or fast animation showing the user what she or he has missed in the last time interval; putting a reminder on the user's calendar related to what the user missed so that the user may remember to learn more about the missed information at a later time; placing a summary of a meeting on an electronic calendar—this could be useful because the meeting date and participants may already be in the original calendar entry; or sending a message summary or signal to other relevant parties, such as for example sending a signal to an assistant of the user to explain the missing conversation or discussion.

In an embodiment, the system personalizes or summarizes the messages and their respective content for visualization by a user, for example as discussed with reference to FIGS. 10 and 13 below. The summarization may include modeling user context with a bag-of-words model where each conversation or conversation thread may be represented as a vector of words. In one embodiment, a user context model is defined as a vector, utilizing information available from previous historic messages, descriptions of conversations threads, and a user profile. Known methods such as similarity metrics (e.g., the cosine similarity metric) may be used to compute the relevance of a given conversation thread or message. Based on these values an embodiment may rank the messages and message threads.

The detected or predicted risks and concern levels in one or more messages, conversations, or discussion channels may be multidimensional in nature, with estimated components stored in a high-dimensional array. Furthermore, in some embodiments, depending upon the value of the concern level, the platform 96 may show, without user action required, a critical message or conversation on a critical-path of a project management diagram.

Figure 3:
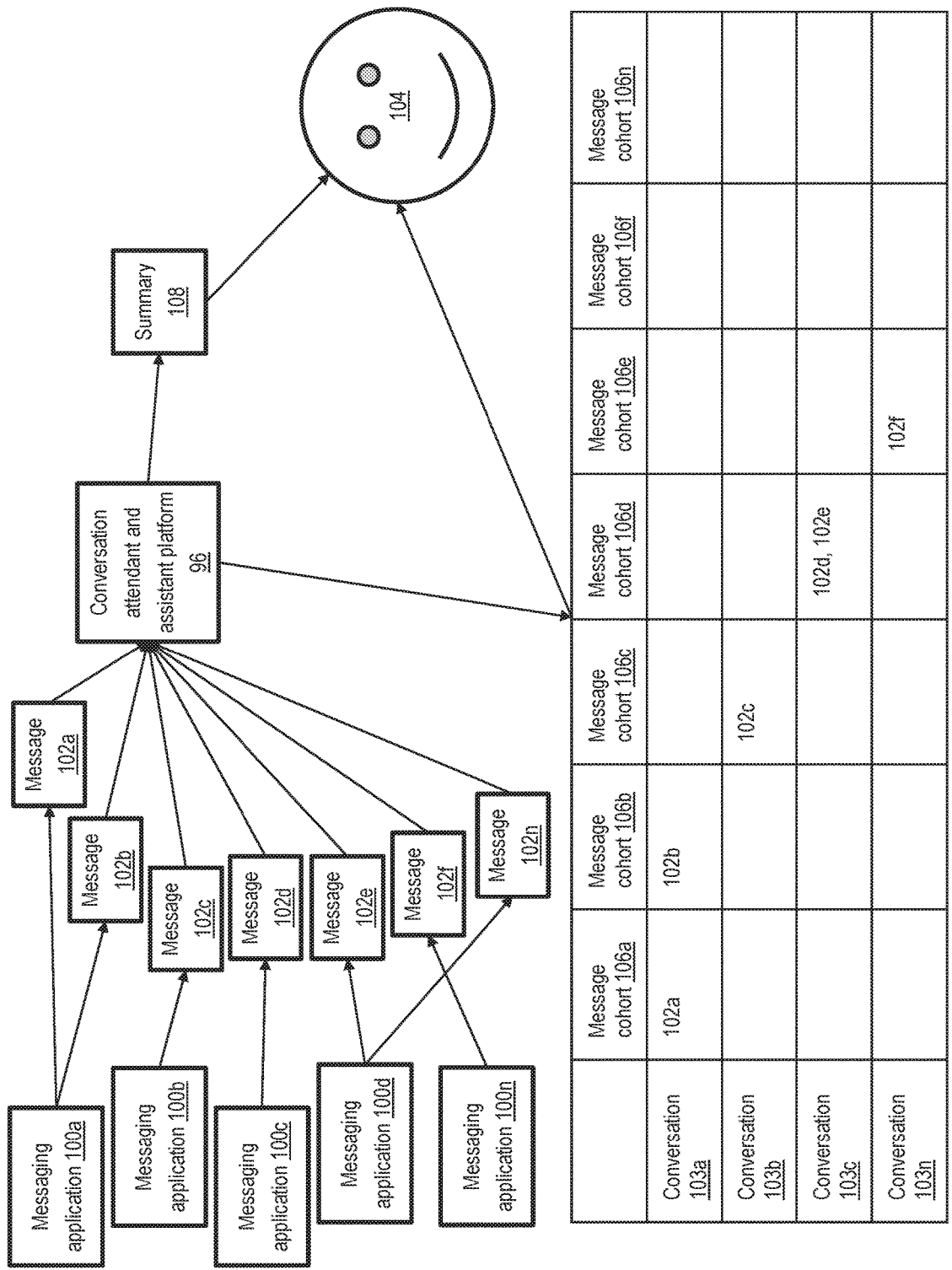
FIG. 3 depicts an environment of a conversation attendant and assistant platform, according to an exemplary embodiment.

FIG. 3 depicts an environment of the conversation attendant and assistant platform 96. The platform 96 interfaces with a plurality of messaging applications 100a . . . n. The plurality of messaging applications 100 produce a plethora of messages 102a . . . n, which the platform 96 intermediates to create conversations 103a . . . n for delivery to a user 104. The messages 102 within a conversation 103 may include text, images, video, and/or audio.

The platform 96 simultaneously attends to and documents for the user 104 each of the conversations 103a . . . n. The platform 96 also helps the user 104 to identify and to act in response to important messages 102. Additionally, the platform 96 groups related messages 102 into "message cohorts" 106a . . . n across the plurality of messaging applications 100. In this context, a "message cohort" is a grouping of messages according to similarity among factors such as sender identity, sender role, recipient identities, time of day, subject, attachments, or message body. Message cohorts 106 coincide partially or completely with conversations 103. Sometimes, a single message cohort 106 includes multiple conversations 103. Sometimes, a single conversation 103 includes multiple message cohorts 106. Moreover, the platform 96 detects whether the user 104 is engaged with any given messaging application 100, and at convenient intervals the platform 96 produces a prioritized summary 108 of activity in messaging applications or conversations with which the user has not been engaged.

Figure 4:
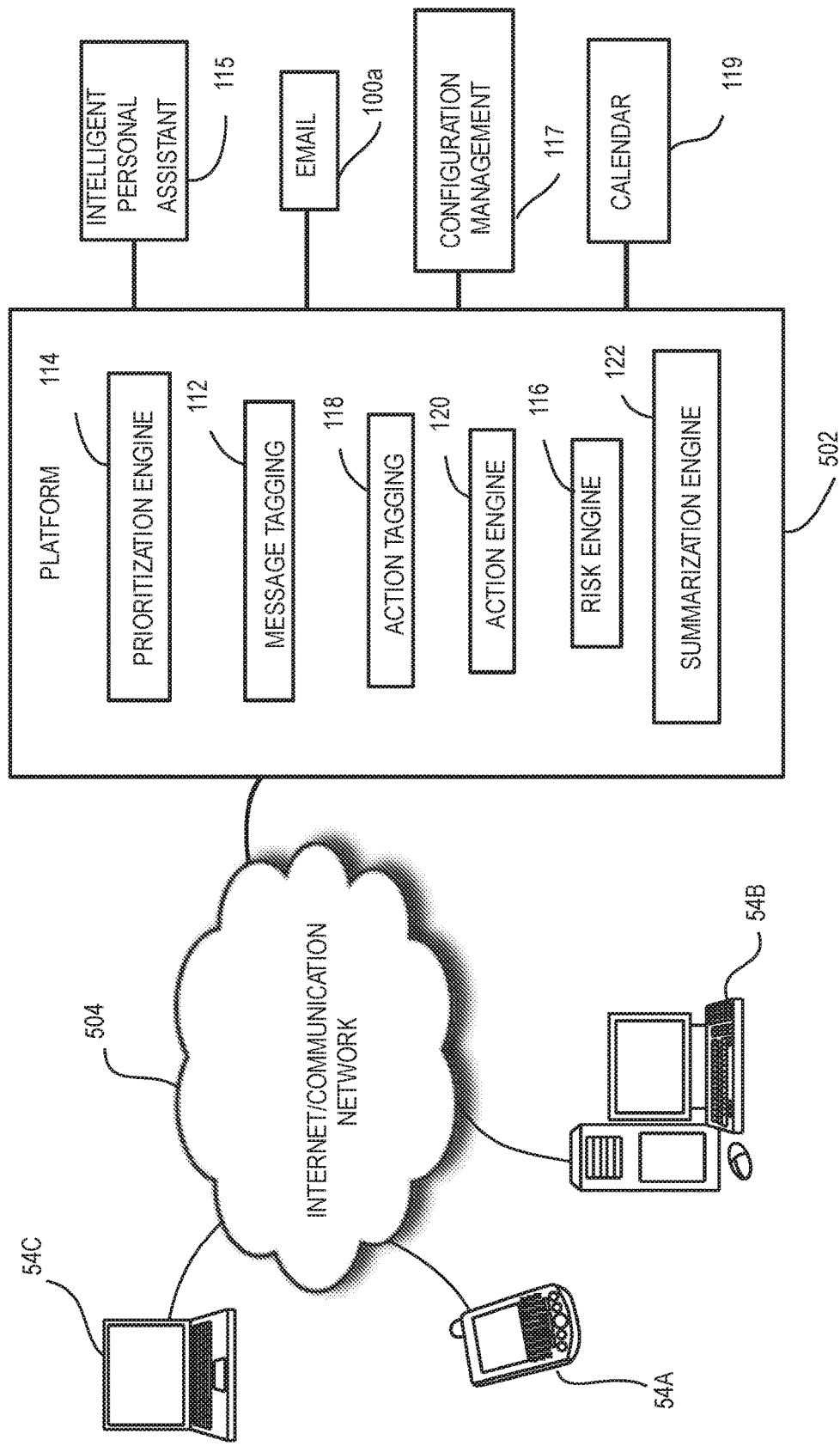
FIG. 4 depicts a high-level architecture of the conversation attendant and assistant platform, according to an exemplary embodiment.

FIG. 4 depicts a high-level architecture of the platform 96. Referring to FIG. 4, the platform 96 communicates with one or more devices—for example, the cellular telephone 54A, the desktop computer 54B, and the laptop computer 54C as illustrated in FIG. 1—by way of a communication network 110. The communication network 110 is a network of networks, including the Internet and one or more communication networks for connecting to various devices, such as for example the cellular telephone 54A, the desktop computer 54B, and the laptop computer 54C. The plurality of messaging applications 100 (which can be provided as SaaS) also communicate with the platform 96 and with the one or more devices 54A . . . C by way of the communication network 110.

Depending upon the concern level, the platform 96 may further identify people whom to send notification messages or other actions, such as for example scheduling a conference call.

The platform 96 includes a message tagging engine 112, a prioritization engine 114, a risk engine 116, an action tagging engine 118, an action engine 120, and a summarization engine 122. The platform 96 implements a method 124 (shown in FIGS. 5-16) for attending to conversations and assisting a user to act in response to the conversations.

The platform 96 relays information and messages to devices (or services), such as an intelligent personal assistant 115 (e.g., Amazon Echo "smart speaker"), an email service 100a, a configuration management system 117 (e.g., for software development, such as "Git"), and a calendar 119.

Figure 5:
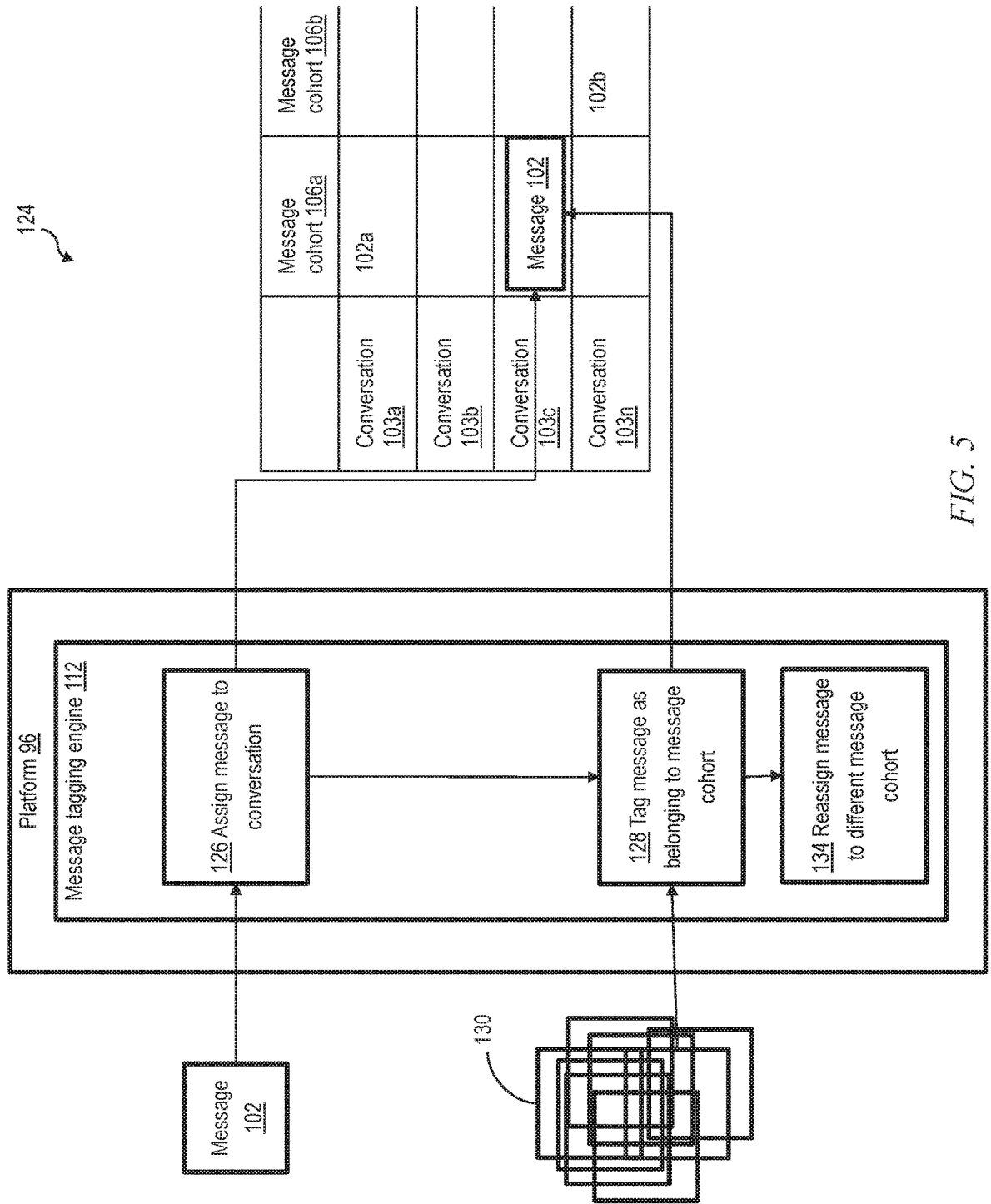
FIG. 5 depicts a method for attending to conversations and assisting a user to act in response to the conversations, according to an exemplary embodiment.

FIG. 5 depicts an exemplary embodiment of the method 124, according to which the message tagging engine 112, at block 126, assigns each of the plethora of messages 102a . . . n in real time to a conversation 103. Conversation assignment 126 can be implemented by a variety of methods familiar to the ordinary skilled worker, e.g., based on subject line and recipients. The method 124 also includes, at block 128, tagging each of the messages 102 as belonging to a message cohort 106. The message tagging engine 112 initially tags each message 102 by comparing the message 102 to a corpus or data set 130 of prior messages already assigned to message cohorts 106a . . . n. Comparing the message is accomplished, for example, by natural language processing (NLP) carried out, for example, by a recurrent neural network (an "RNN"), which groups similar messages 102 in an unsupervised manner (i.e., learning from unlabeled messages) to produce the message cohorts 106. Grouping may be accomplished, for example, by implementing cosine similarity function on the text vectors of the messages 102 (e.g., message body, subject, attachments text or file names, recipients and senders); or by undertaking conceptual indexing of the messages 102.

Generally, a neural network includes a plurality of computer processors that are configured to work together to implement one or more machine learning algorithms. The implementation may be synchronous or asynchronous. In a neural network, the processors simulate thousands or millions of neurons, which are connected by axons and synapses. Each connection is enforcing, inhibitory, or neutral in its effect on the activation state of connected neural units. Each individual neural unit has a summation function which combines the values of all its inputs together. In some implementations, there is a threshold function or limiting function on at least some connections and/or on at least some neural units, such that the signal must surpass the limit before propagating to other neurons. A neural network can implement supervised, unsupervised, or semi-supervised machine learning.

Figure 6:
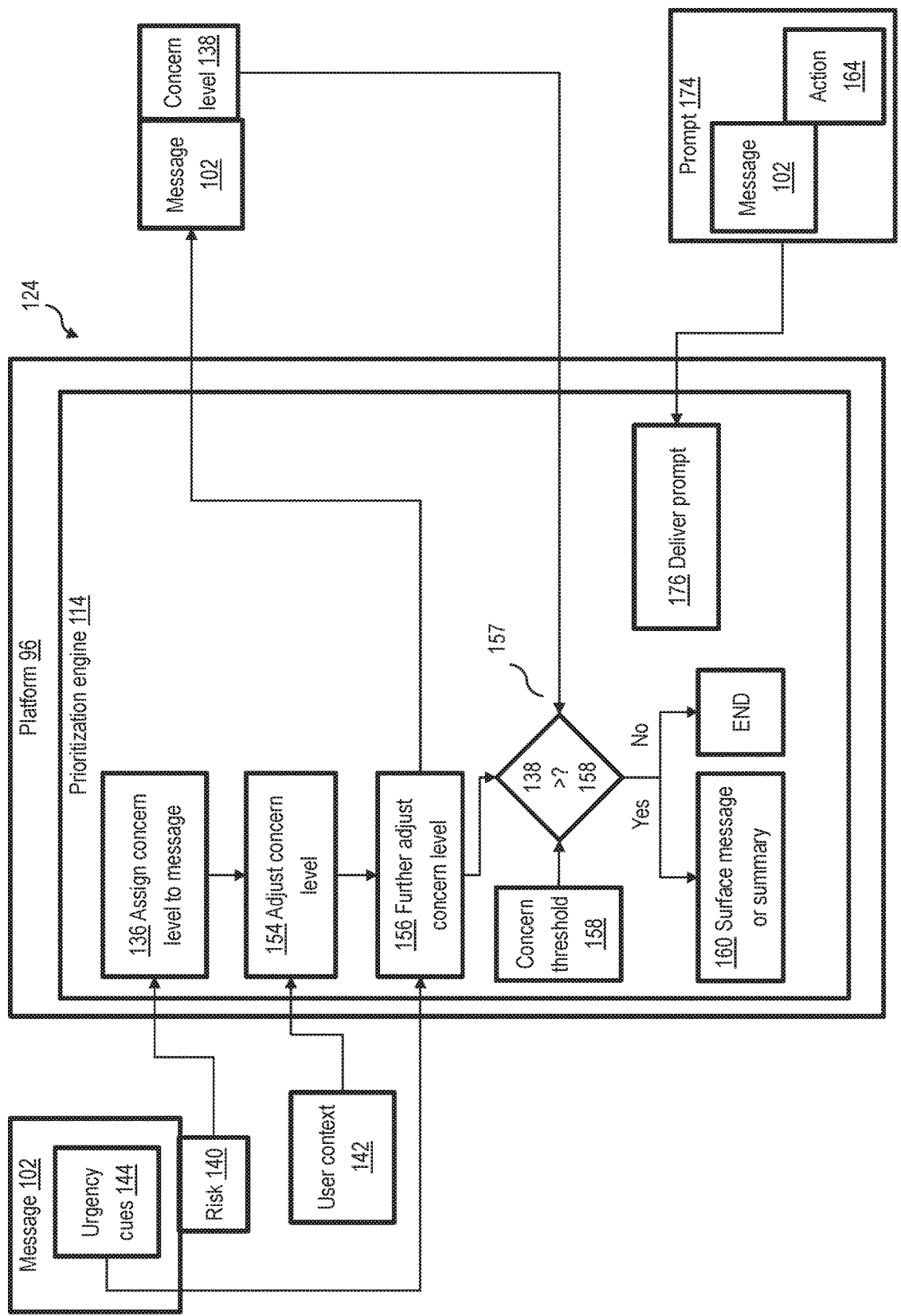
FIG. 6 depicts operation of a prioritization engine of the conversation attendant and assistant platform, according to an exemplary embodiment.

In one or more embodiments, as depicted in FIG. 6, at block 136 the prioritization engine 114 assigns each message 102 a "concern level" 138 in response to factors including a risk 140 of the user 104 failing to act on a message 102 from the message cohort 106, user context 142, and urgency cues 144 within the message 102. The risk engine 116 estimates the risk 140 in response to specific rules, which are further discussed below with reference to FIG. 7.

Figure 7:
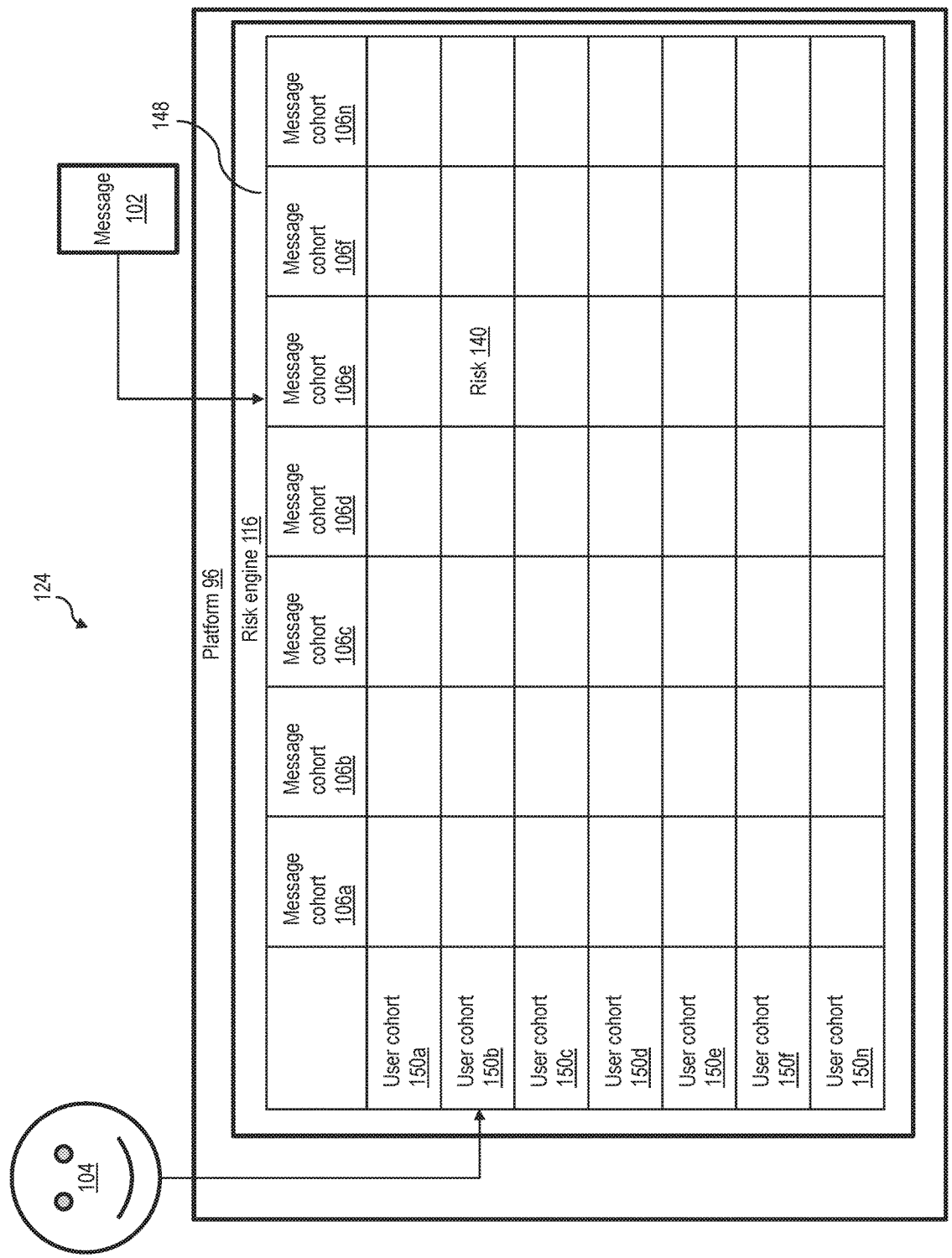
FIG. 7 depicts operation of a risk engine of the conversation attendant and assistant platform, according to an exemplary embodiment.

For example, referring to FIGS. 3 and 7, messages 102a . . . c respectively belong to a first message cohort 106a that is related to corporate network status, to a second message cohort 106b that is related to legacy software product bug reports, or to a third message cohort 106c that is related to company cafeteria menus.

In one or more embodiments, the risk engine 116 estimates the risk 140 according to rules 148 that are responsive to the user's membership in any of a plurality of "user cohorts" 150a . . . n and responsive to the relationships of the user cohorts 150 to the message cohorts 106. In one or more embodiments, the risk engine 116 calculates a basic relevance score or risk 140, responsive to a combination of message cohort 106 with user cohort 150. In this context, a "user cohort" is a grouping of users sharing similar characteristics, e.g., job description, location, or corporate interactions. For example, a given user 104 may be a member of a first user cohort 150a as a network system administrator, a member of a second user cohort 150b as an internal beta tester for new software products, and a member of a third user cohort 150c as an occasional customer in the cafeteria at the main company campus. For the given user, the risk engine 116 would generally assign a higher risk 140 to message 102a from the first message cohort 106a (based on membership of the given user in user cohort 150a) than to messages from the other two message cohorts. If the given user were a member of a fourth user cohort 150d as a legacy software product maintainer, then the risk engine 116 would assign a higher risk 140 to messages from message cohort 106b.

In one or more embodiments, the risk engine 116 is configured to identify important missed messages or predicted to be missed messages in a supervised fashion based on historical conversations and determined user context, responsive to a label provided by the user; the risk engine 116 then uses NLP to look for similar messages going forward. According to certain embodiments, the risk engine 116 makes use of similarity matrices across different types of messages. The risk engine 116 can be configured with a database of high priority/important and low priority/important message key words, and can assign risk 140 to a message to a cohort of importance, urgency, etc. based for example on user cohort of sender or presence of text matching (cosine similarity) previous messages in a given cohort labeled by user.

In one or more embodiments, the risk engine 116 learns the risk 140 of a given message cohort 106 for a given user 104 in an unsupervised fashion, responsive to user interactions with messages 102 in the message cohort 106 and responsive to user actions taken in response to messages 102 in the message cohort 106. For example, if the given user 104 consistently deletes messages 102d, 102e of a fourth message cohort 106d without opening or reviewing the messages, then the risk engine 116 learns that the user 104 has a tenuous (low risk) relationship with messages in the fourth message cohort 106d. On the other hand, if the given user 104 carefully reviews messages of a fifth message cohort 106e (e.g., message window open and active for more than one minute continuously), replies to most such messages promptly (e.g., within two minutes), and/or replies to most such messages at length (e.g., more than one paragraph reply; more than two minutes to write a reply), then the risk engine 116 learns that the user has a relatively close (moderate risk) relationship with messages in the fifth message cohort 106e. Further, if the given user consistently acts in response to messages of a sixth message cohort 106f (e.g., by pushing code to a repository), then the risk engine 116 learns that the user has a close (high risk) relationship with messages in the sixth message cohort 106f. Thus, in one or more embodiments the conversation attendant and assistant platform 96 can be implemented with a monitoring feature that continuously observes a user's activities using job-related computing equipment. For example, the user can login to job-related applications (e.g., a VPN; messaging or e-mail applications; a software development environment (SDE), etc.) via the platform 96. As another example, the platform 96 can be integrated into VPN software associated with the user's employment. Such monitoring features are commonplace in corporate environments.

Referring again to FIG. 6, in one or more embodiments, the prioritization engine 114 initially at block 136 assigns the concern level 138 based solely on the risk 140, then at block 154 adjusts the concern level 138 in response to user context 142. For example, the user context 142 may indicate that the user has not participated in a conversation 103 for some time interval P, or that the user is in a resource constrained area so that access to the conversation may be limited. In either case, the prioritization engine 114 would increase the concern level of (would "escalate") the conversation 103. In an embodiment, the prioritization engine 114 takes into account the environment of the user 104 in determining whether the user is in a resource constrained area, such as for example when the user is traveling by airplane, experiencing poor network coverage, or has infrequent network access due to associated costs. Such variables may be collected and used to augment the manner in which the messages and notifications are summarized and presented to the user. For example, a number of messages summarized may be larger in resource constrained environments depending upon the time intervals between viewing the messages and notifications by the user. User context 142 also may include a relational score responsive to the estimated relationship of the user to other respondents in the conversation or thread. The relational score may represent the importance (e.g., message length or key words) and frequency of correspondence between the user and other respondents. In one or more embodiments, the prioritization engine 114 monitors a dynamic user context responsive to the user's dynamic tagging of tasks and semantic analysis of outgoing messages to evaluate the user's sentiment or emotions.

In one or more embodiments, at block 156 the prioritization engine 114 further adjusts the concern level 138 in response to urgency cues 144 within the message 102. For example, the prioritization engine 114 would escalate a message of which the given user 104 was the subject or the only recipient, or a message sent by the company CEO or human resources, or a message sent by a client with whom the given user recently had been working intensively. Additionally, the prioritization engine 114 would escalate a message responsive to the presence of key terms in the message (e.g. "deployment", "testing", "urgent", "clarification"); would escalate a message according to a lateness factor that is responsive to a gradual increase in message risk as time passes; or would de-escalate a message according to a dampening factor that is responsive to a gradual decay in message value as time passes. In one or more embodiments, the prioritization engine 114 learns the key terms, the lateness factor, and the dampening factor in a supervised manner.

Thus, in one or more embodiments at block 136 the prioritization engine 114 assigns a concern level 138 to each message 102 that the conversation attendant and assistant platform 96 intermediates and processes on behalf the user 104; at blocks 154 and 156 the prioritization engine 114 adjusts and further adjusts the assigned concern level 138. In one or more embodiments, the prioritization engine 114 further provides at block 157 comparing the concern level 138 to a concern threshold 158 defined by the user 104, and at block 160 "surfacing" any message 102 or summary 108 that exceeds the concern threshold 158. "Surfacing" a message or summary may include an audible tone, a visible icon, a newly-opened message window, a full screen splash, placement at the top of a list, etc. For example, a user may actually specify a desire to be notified when a discussion related to requirement or deployment becomes critical because the user has missed deliverables in the past. Furthermore, resulting notifications can prompt users through augmented reality, an intelligent personal assistant (e.g., Amazon Echo "smart speaker" or Amazon Alexa), or a mobile device based on a user setting and a value of the concern level of the conversation or discussion.

Figure 8:
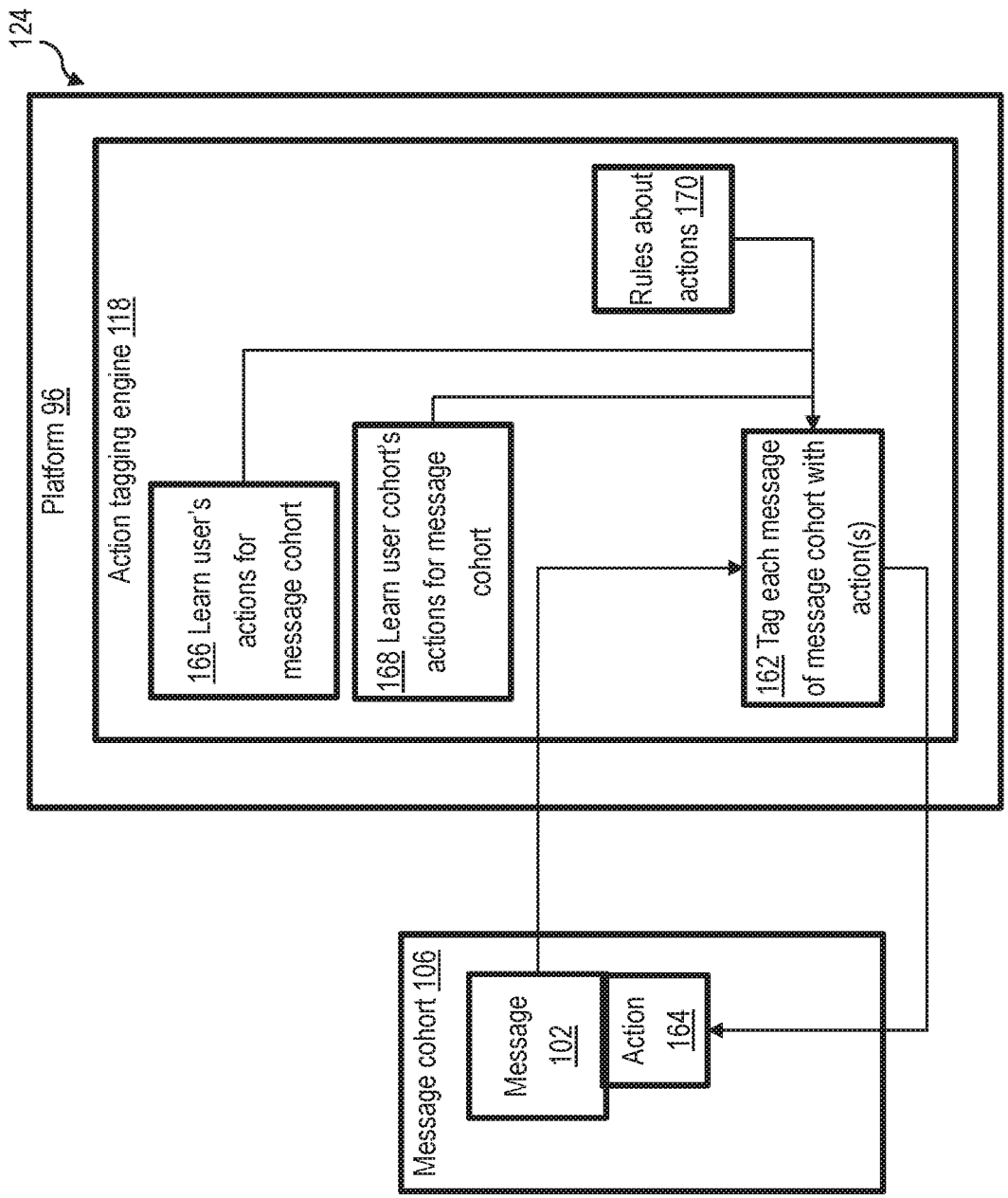
FIG. 8 depicts operation of an action tagging engine of the conversation attendant and assistant platform, according to an exemplary embodiment.

Referring to FIG. 8, the action tagging engine 118, at block 162, tags each message 102 of a given message cohort 106 with an action or actions 164 that the action tagging engine associates with the given message cohort. In one or more embodiments, at block 166 the action tagging engine 118 learns in an unsupervised fashion what actions 164 a given user 104 associates with messages 102 of a given message cohort 106. For example, this learning is adapted from the unsupervised learning of the risk engine 116. At block 166, the action tagging engine 118 monitors tracking the user's actions in response to particular categories of messages, e.g., time association of action to message reading. According to one or more embodiments, at block 168 the action tagging engine also learns in an unsupervised fashion what actions 164 a majority or large number of members of a given user cohort 150 (to which the user belongs) associate with messages of a given message cohort 106, and also tags the given message cohort with those actions. For example, referring back to the user 104 who was discussed with reference to the fourth, fifth, and sixth message cohorts 106d, 106e, 106f in FIG. 7: the action tagging engine 118 would tag messages of the fourth message cohort 106d with "delete" actions, would tag messages of the fifth message cohort 106e with "open" actions, and would tag messages of the sixth message cohort 106f with "code repository login" and "code repository push" actions.

In one or more embodiments the action tagging engine 118 is configured with expert rules 170 that associate actions 164 with message cohort/user cohort combinations. For example, the rules 170 track which software/platforms the user has subscribed to or is using (e.g., Git, Outlook) and include a dictionary of actions and key words associated with each software package. The rules 170 can be preconfigured or can be learned in a supervised or semi-supervised fashion, for example, the rules 170 can be learned from a corpus of messages/documents responsive to actions assigned by a user to selected messages within the corpus. Thus, according to these embodiments, at block 162 the action tagging module 118 looks for similarity between the key words and content of a message 102, using NLP, semantic analysis, or similar tools, then tags each message 102 with one or more actions from the dictionary of rules 170.

Figure 9:
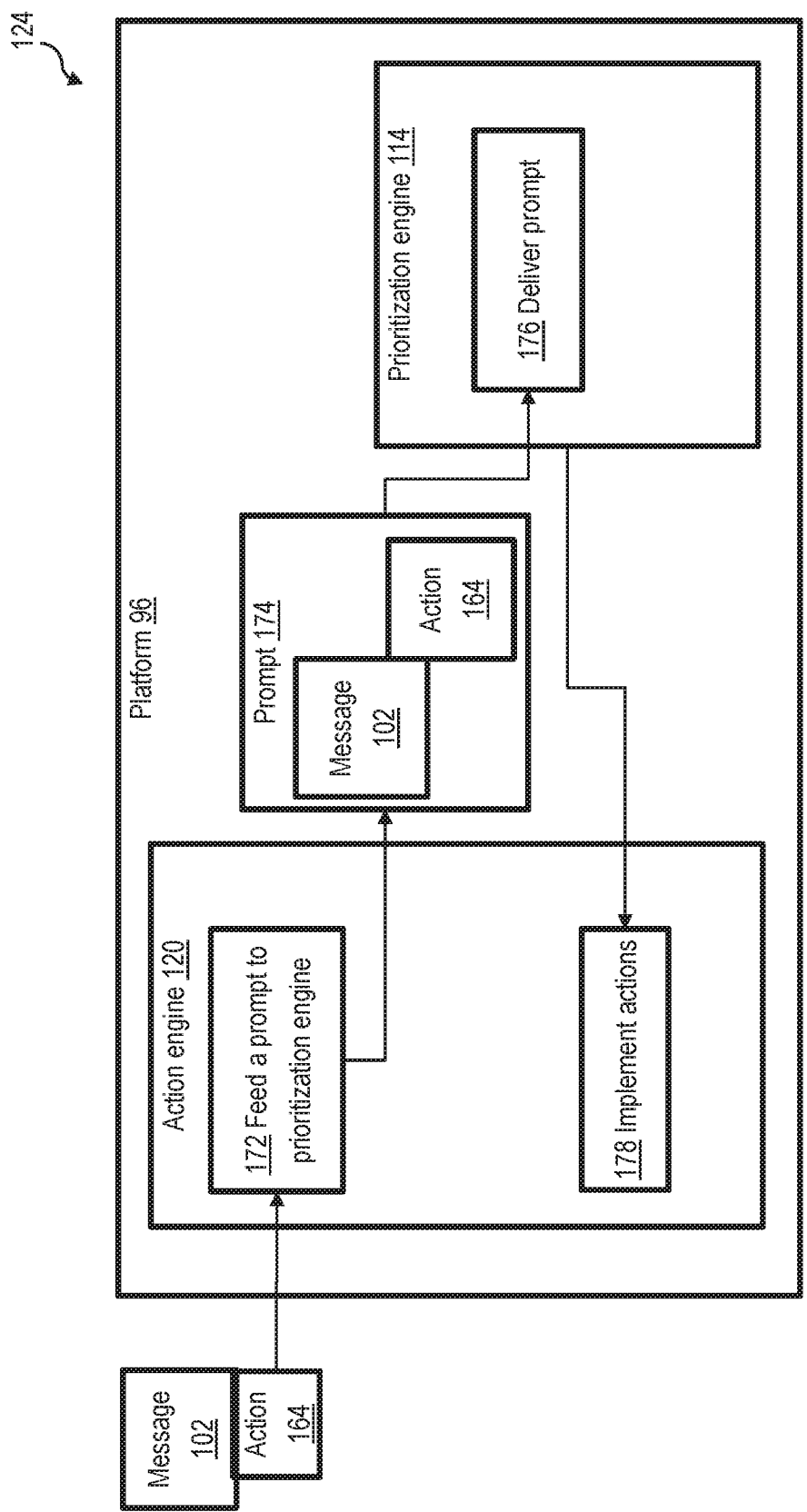
FIG. 9 depicts operation of an action engine of the conversation attendant and assistant platform, according to an exemplary embodiment.

FIG. 9 depicts the operation of the action engine 120 according to the method 124. When the platform 96 receives a given message 102, the action tagging engine 118 tags the message 102 as previously discussed. At block 172, the action engine 120 then feeds a prompt 174 to the prioritization engine 114. The prompt 174 contains the message 102 and the actions 164 that are associated with the message. Referring also to FIG. 6, at block 176 the prioritization engine 114 delivers the prompt 174 either immediately along with the message 102 or at a convenient interval along with a summary 108 that includes the message 102 (depending whether the user 104 has been engaged with (attending) the conversation 103 that includes the message 102). The prompt 174 presents the user 104 with an opportunity to implement the actions 164 that the action tagging engine 118 has associated with the message cohort 106 that includes the message 102. For example, referring again to the user 104 and the message cohort 106f discussed with reference to FIG. 7, the action engine 120 would provide the user 104 with a prompt 174 to, e.g., push code from a default file path (e.g., a first URL) to a code repository (e.g., a second URL). In case the user 104 accepts the prompt 174, then at block 178 the action engine 120 implements the actions 164.

Figure 10:
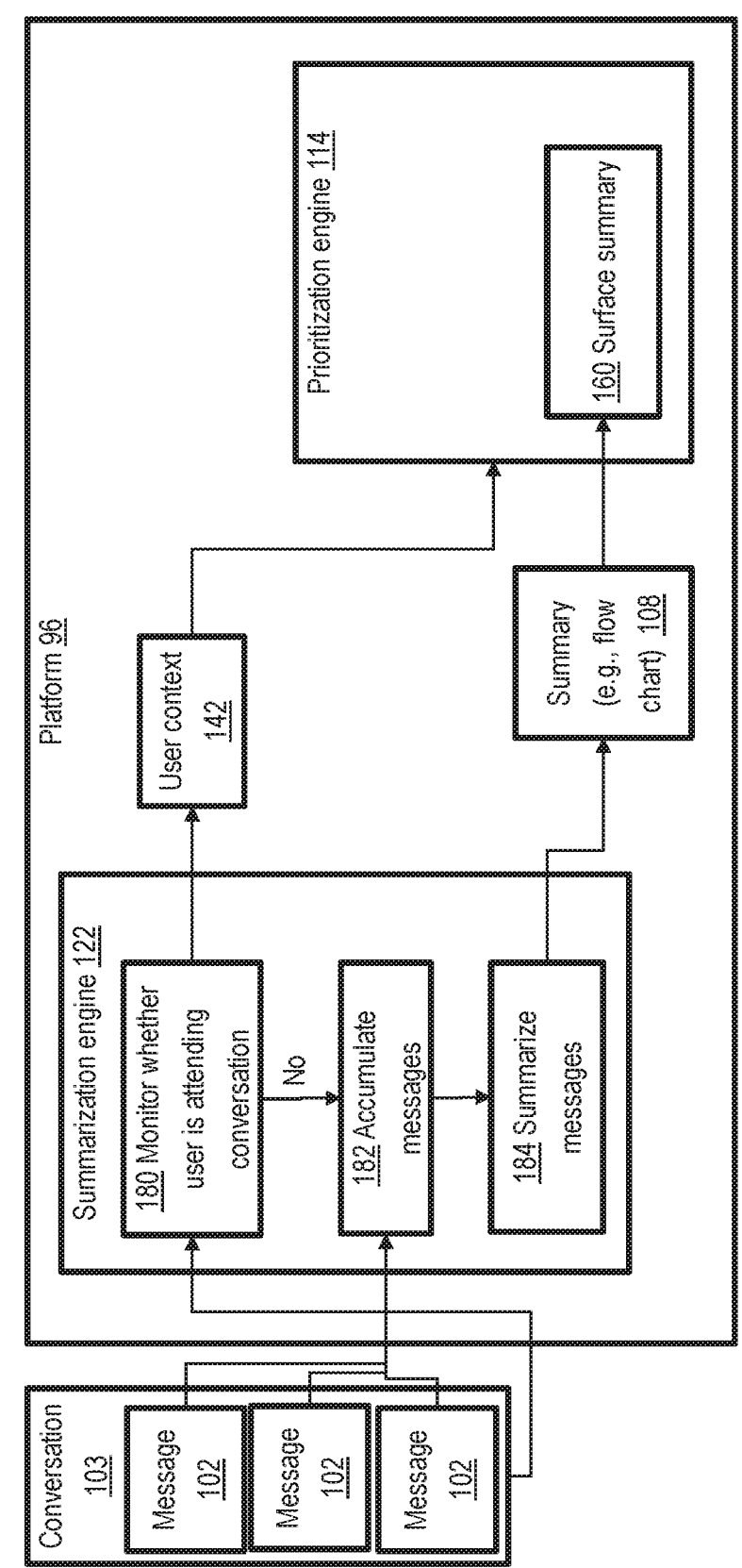
FIG. 10 depicts operation of a summarization engine of the conversation attendant and assistant platform, according to an exemplary embodiment.

FIG. 10 depicts the operation of the summarization engine 122, which provides certain aspects of the conversation attendant functionality of the platform 96. At block 180, the summarization engine 122 monitors whether the user 104 is attending a conversation 103 (user context 142), and provides the user context 142 to the prioritization engine 114. In case the user 104 is not attending a given conversation 103, then the summarization engine 122 at block 182 accumulates messages 102 of the conversation 103 and at block 184 summarizes the messages 102 to produce the summary 108 that the summarization engine 122 associates with the conversation 103. For example, at block 184 the summarization engine 122 implements NLP on the accumulated messages 102 by using a text classification algorithm to identify key words in the conversation 103.

By way of example, a user stops attending a teleconference for any of a variety of reasons, such as shifting task focus to a different window in the platform 96, or sudden loss or attenuation of communications connectivity. The summarization engine 122 detects the user's lack of attendance, and estimates that a "period of concern" for the user exists from 3:00 until 3:15 when the user returns to attend the teleconference. During the period of concern, the summarization engine 122 creates a flow chart of topics discussed, and passes this flow chart to the prioritization engine 114 to be surfaced as an entry on the user's calendar corresponding to the time period 3:00-3:15. For example, the summarization engine 122 uses NLP, latent semantic indexing, or other methods of topic extraction to determine that the topic of a teleconference meeting drifted from "blockchain" to "artificial intelligence" and then back to "blockchain" during this period of time. The summarization engine 122 then creates the flow chart by drawing a box around topic 1, then an arrow pointing to topic 2, and then an arrow pointing back to topic 1. The flow chart is appended to the calendar entry. The flow chart provides, to the user, a useful kind of summarization regarding what the user missed during this period of concern (e.g. period of distraction, or being away from the conversation, or having a poor connection to the Internet.) At a convenient interval, the prioritization engine 114 then proceeds to block 160 and surfaces the flow chart summary 108, e.g., by shifting focus to the calendar entry.

Figure 11:
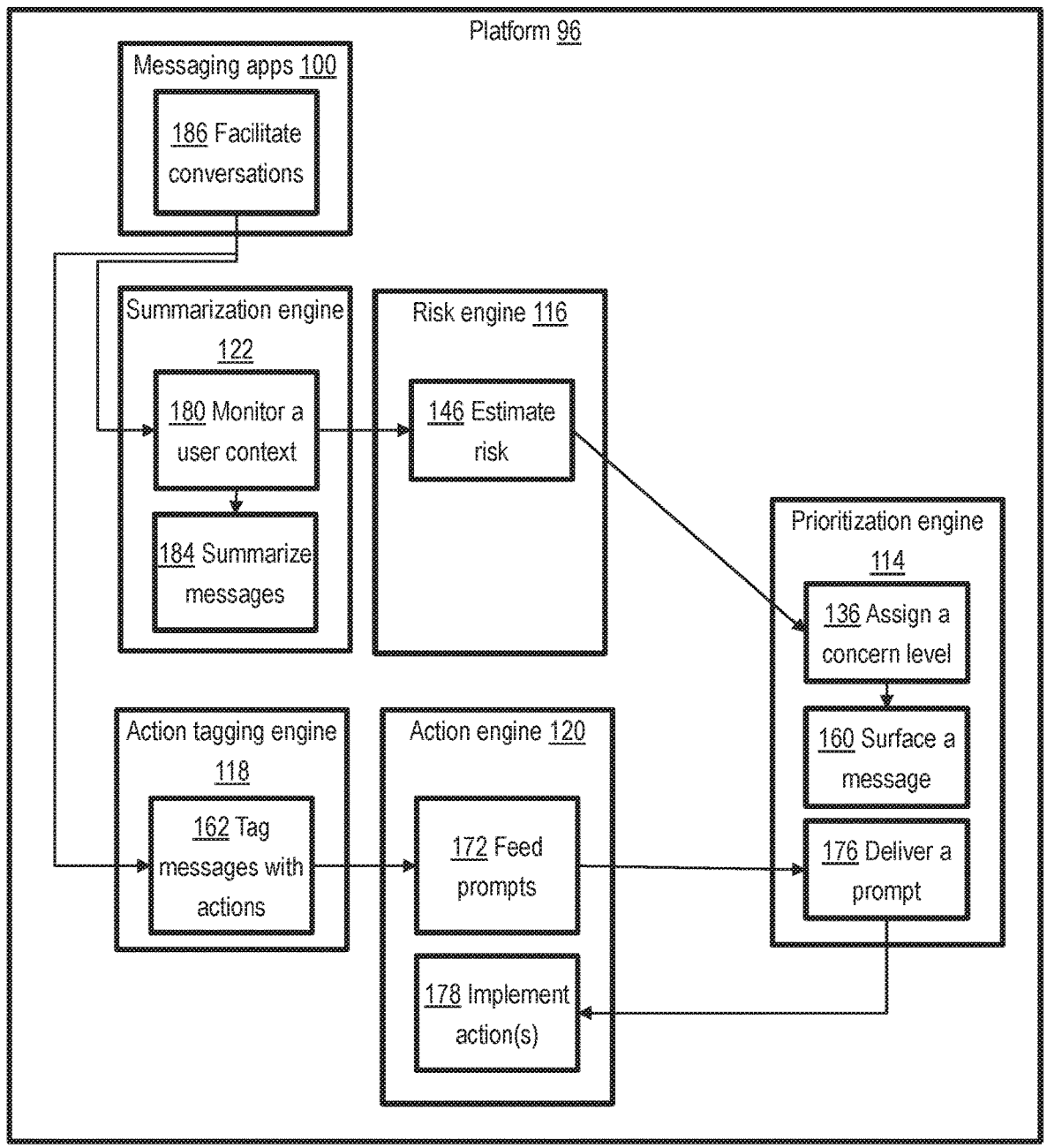
FIG. 11 depicts an overall method of operation of the conversation attendant and assistant platform, according to an exemplary embodiment.

Accordingly, FIG. 11 depicts an overall operation of the platform 96, with each general action shown within a block corresponding to the engine that implements the action. Thus, at block 186 one or more messaging applications 100 facilitate conversations. At block 180 the summarization engine 122 monitors the user context associated with each of the conversations, including whether the user is attending the conversation. At block 184 the summarization engine 122 summarizes messages and conversations that a user is not attending. The risk engine 116, at block 146, estimates the user's risk associated with not attending each of the conversations. At block 136 the prioritization engine 114 assigns a concern level to each message within each of the conversations. The action tagging engine 118, at block 162, tags each message with an amelioration action or actions. At block 172, the action engine 120 feeds to the prioritization engine 114 prompts corresponding to the actions tagged by the action tagging engine. The prioritization engine 114, at block 160, surfaces a message or summary for which the concern level exceeds a threshold defined by the user. When the prioritization engine 114 surfaces a message or summary, it also delivers at block 176 the prompts that were fed to it by the action engine 120. In response to the user accepting a prompt, the action engine 120 implements at block 178 the actions associated with the prompt.

Figure 12:
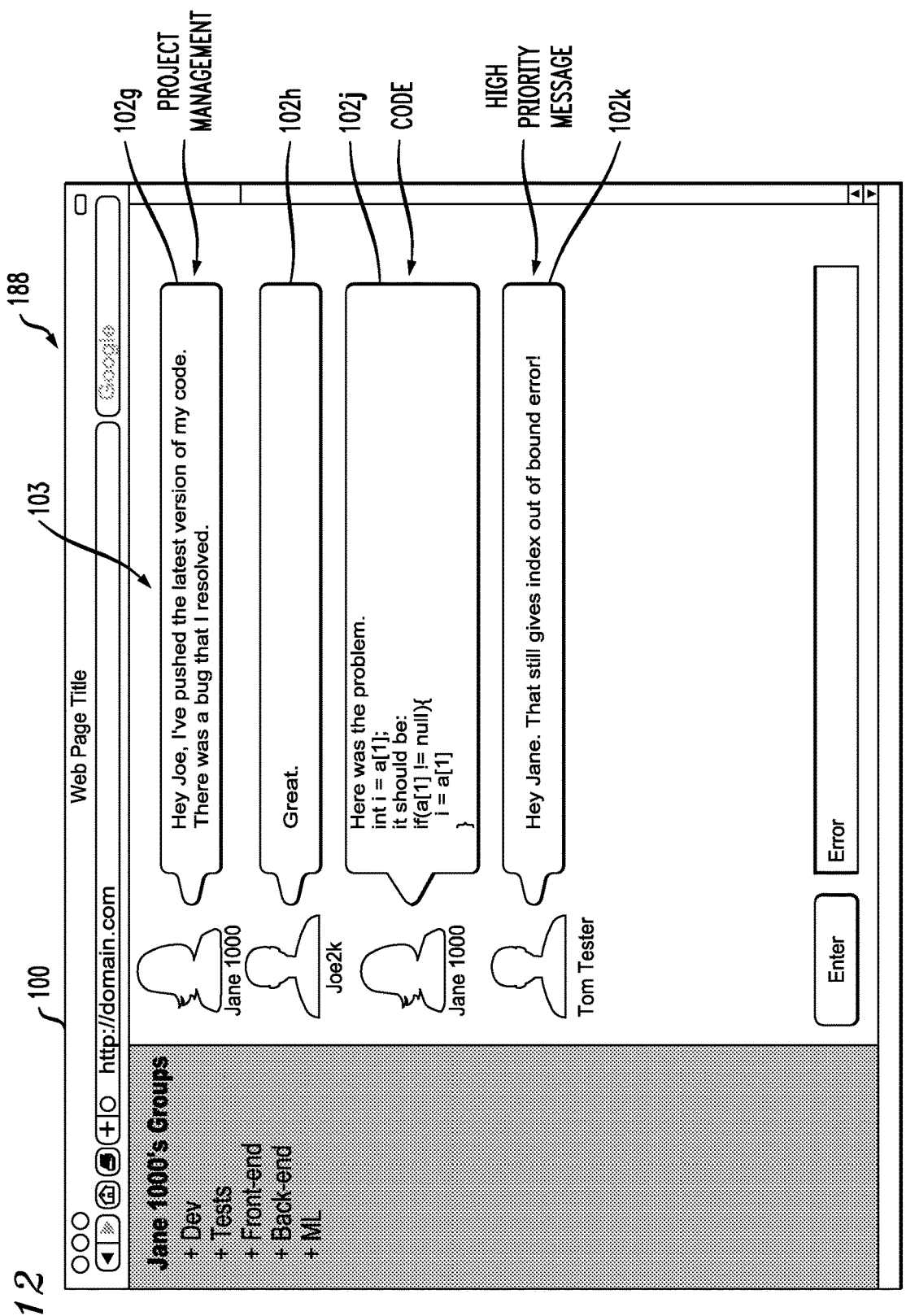
FIG. 12 depicts a messaging interface that is provided for facilitating conversations within the conversation attendant and assistant platform, according to an exemplary embodiment.

FIG. 12 depicts a messaging interface 188 that is provided by one of the messaging applications 100 for facilitating conversations 103 within the platform 96. According to one or more embodiments, the conversation attendant and assistant platform 96 modifies the messaging interface 188 to highlight messages 102a . . . n according to their respective concern levels as determined by the prioritization engine. For example, the messaging interface 188 does not highlight the messages 102g . . . h, which belong to a "project management" message cohort and are assigned a low concern level. The messaging interface 188 highlights message 102j, which belongs to a "code" message cohort and is assigned a moderate concern level, in a first color. The messaging interface 188 highlights message 102k, which belongs to an "error" message cohort and is assigned a high concern level, in a second color. Additionally, the prioritization engine surfaces message 102k, e.g., by shifting focus to the messaging interface 188.

Figure 13:
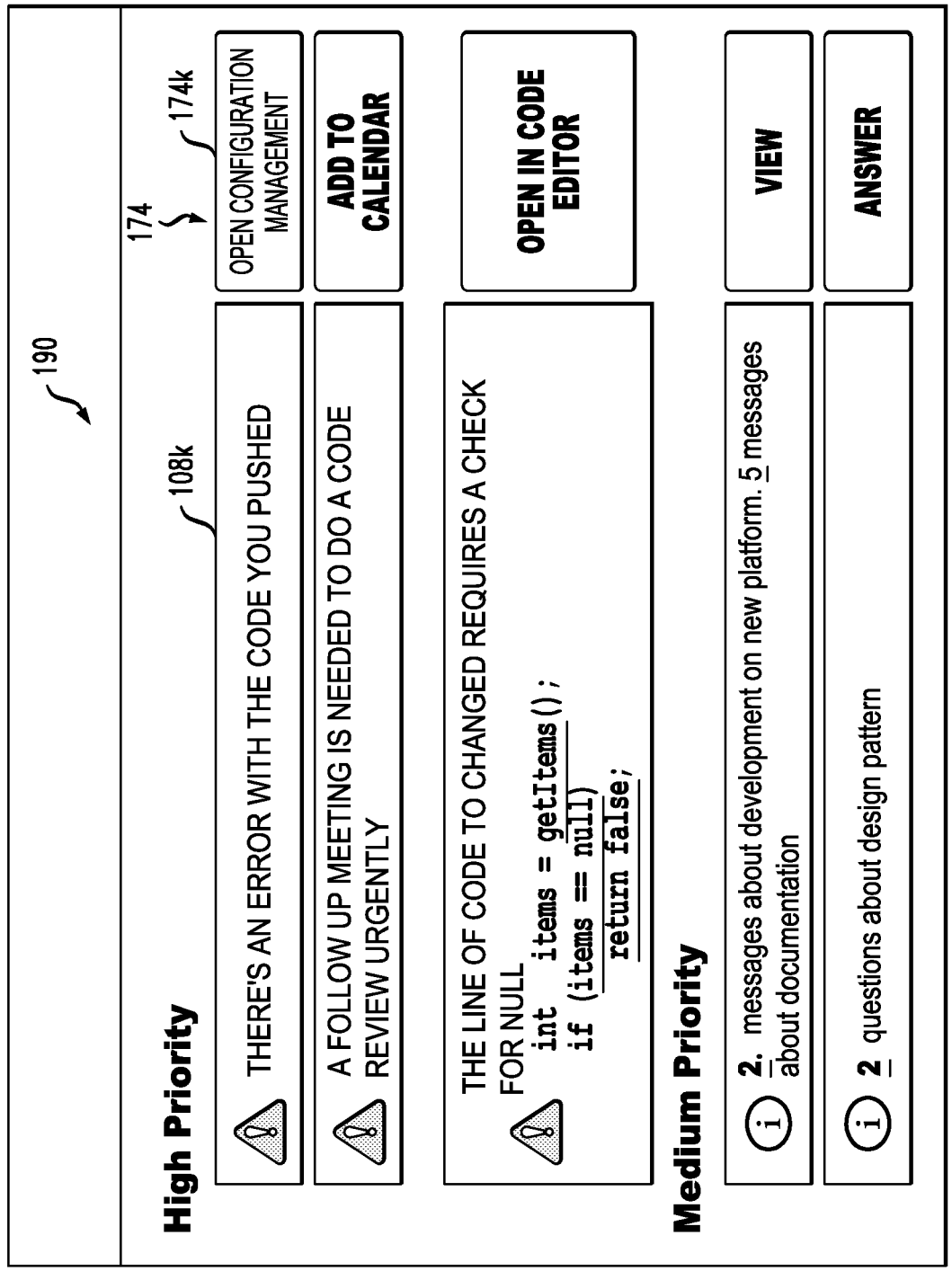
FIG. 13 depicts a summary interface that is provided for surfacing message summaries within the conversation attendant and assistant platform, according to an exemplary embodiment.

FIG. 13 depicts a summary interface 190 by which the prioritization engine 114 surfaces message summaries 108. High priority messages (e.g., message 102k as discussed above with reference to FIG. 12) are surfaced in individual summaries (e.g., summary 108k). Medium priority messages are surfaced in summaries 108, which compile plural messages from a cohort 106 or conversation 103. As discussed above with reference to FIGS. 8 and 9, the prioritization engine 114 displays in the summary interface 190 action prompts 174 associated with each message 102 or summary 108.

Figure 14:
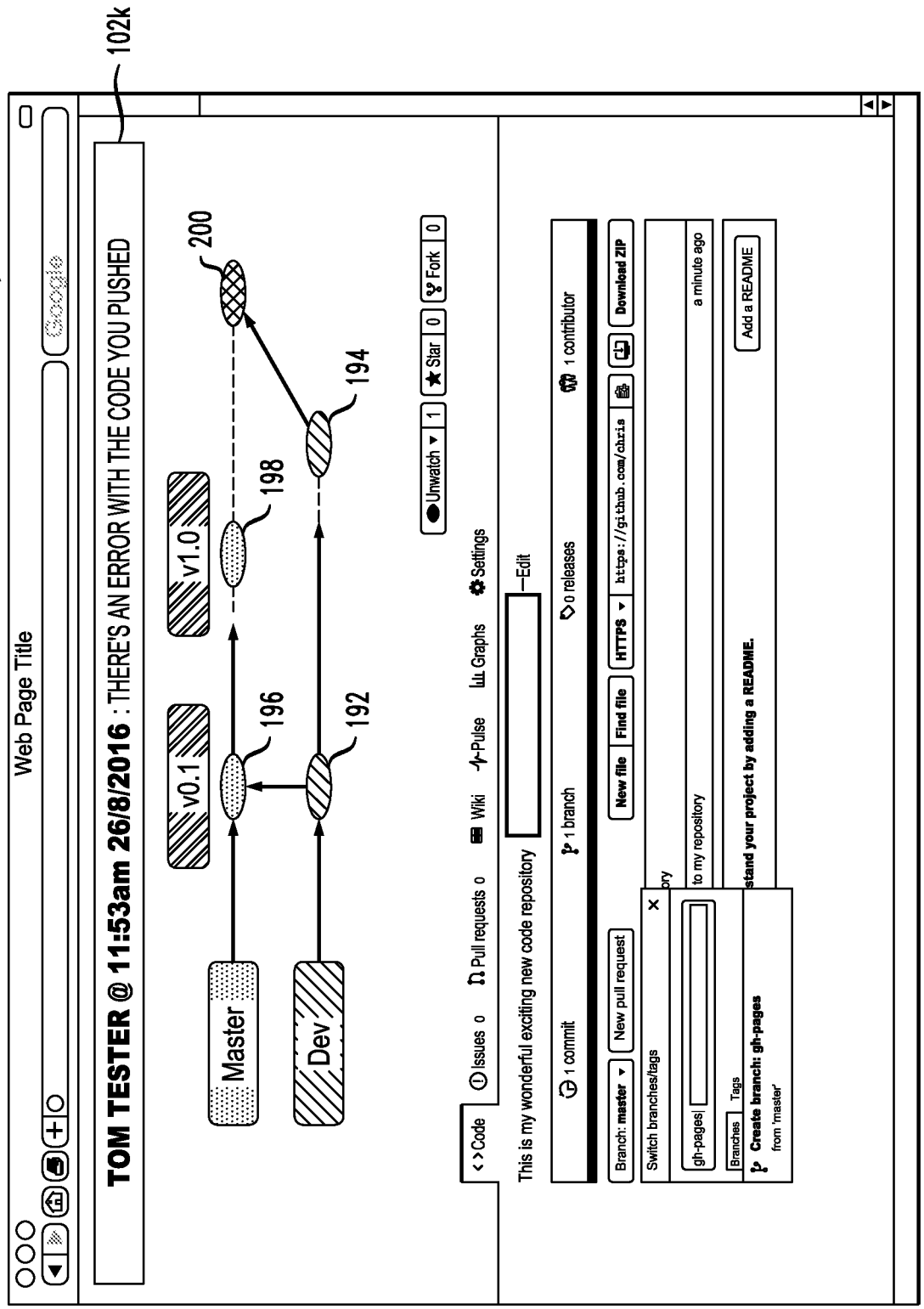
FIG. 14 depicts an example of generated and displayed output after a user has selected a recommended action for responding to a message within the conversation attendant and assistant platform, according to an exemplary embodiment.

FIG. 14 illustrates an example of generated and displayed output after the user 104 has clicked on one of the recommended actions (here, the action 174k of FIG. 13) to access a configuration management tool. The user is presented with a version control system 191, and the platform 96 displays over the version control system the original message 102k (or in some cases the summary 108k) from the messaging application, with a visualization that tracks the software bug in the code. In the visualization represented in FIG. 14, ovals 192, 194 may be, for example, yellow to represent code pushed into the development branch while ovals 196, 198 may be, for example, green to represent code pushed into the master branch. The flagged code is represented by oval 200 which may be, for example, red.

Figure 15:
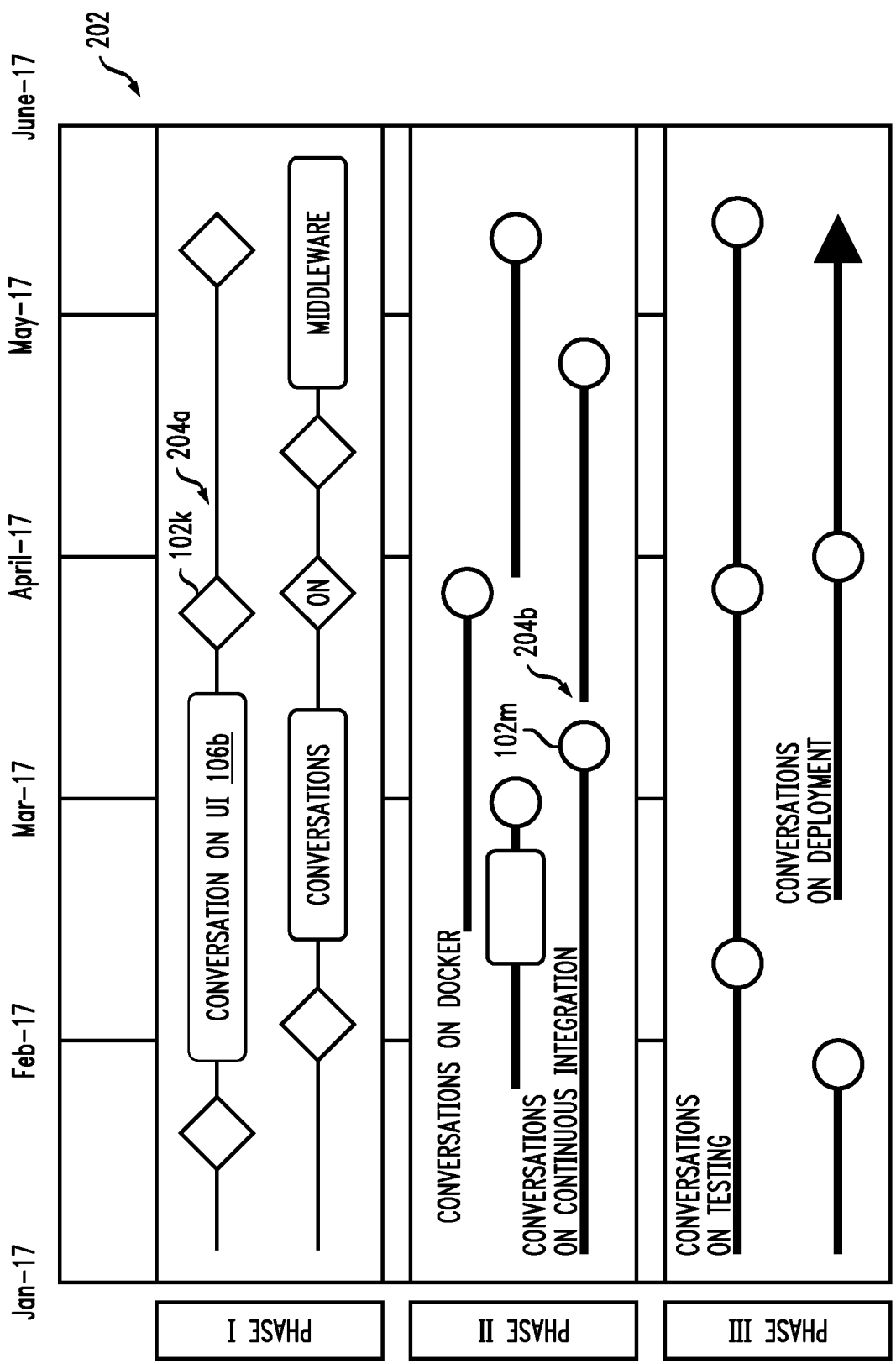
FIG. 15 depicts a critical path diagram that is marked up within the conversation attendant and assistant platform, according to an exemplary embodiment.

FIG. 15 depicts a critical path diagram 202 that has portions 204a . . . n marked up with messages 102a . . . n of various concern levels relating to the marked portions of the critical path. For example, the summarization engine 122 can detect, using NLP, that message 102k relates to a bug report in a user interface for a new product, and that the user interface is shown as a first portion 204a of the critical path 202. Additionally, the summarization engine 122 can detect that a second message 102m relates to continuous integration of the new product, and that the continuous integration process is shown as a second portion 204b of the critical path 202.

Figure 16:
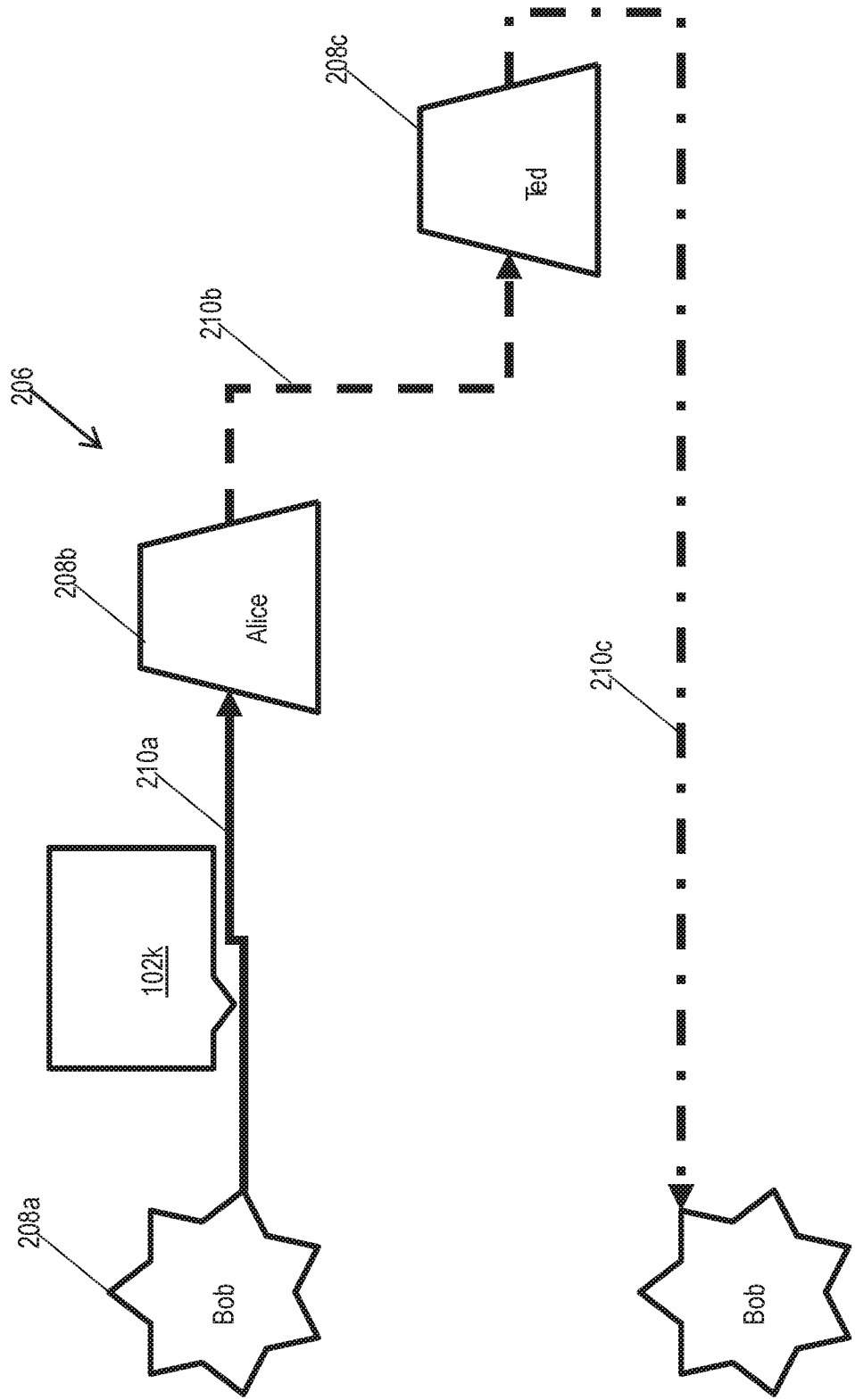
FIG. 16 depicts a flow chart of a conversation among several people that is displayed within the conversation attendant and assistant platform, according to an exemplary embodiment.

FIG. 16 depicts a flow chart 206 of a conversation among several people. Assume that Bob is a manager of the programming staff, and Alice and Ted are programmers. The flow chart 206 includes symbols or shapes 208a . . . c that represent the respective roles of Bob, Alice, and Ted. The summarization engine 122 identifies Bob by his e-mail address or messaging login or by voice recognition if the conversation is verbal. The flow chart includes arrows 210 that represent messages 102; for example, an arrow 210a indicates that Bob is communicating to Alice the message 102k. Graphical characteristics of each of the arrows 210 indicate an estimated emotionality of the corresponding message, along with a confidence level of that estimation. The summarization engine 122 estimates emotion or mood in response to facial expressions, word analysis, voice analysis, etc. For example, graphical characteristics of an arrow are responsive to the presence of key words in a message corresponding to the arrow. Clicking on one of the arrows 210 reveals the entire content of the corresponding message 102, e.g., via real-time speech-to-text transcription.

Figure 17:
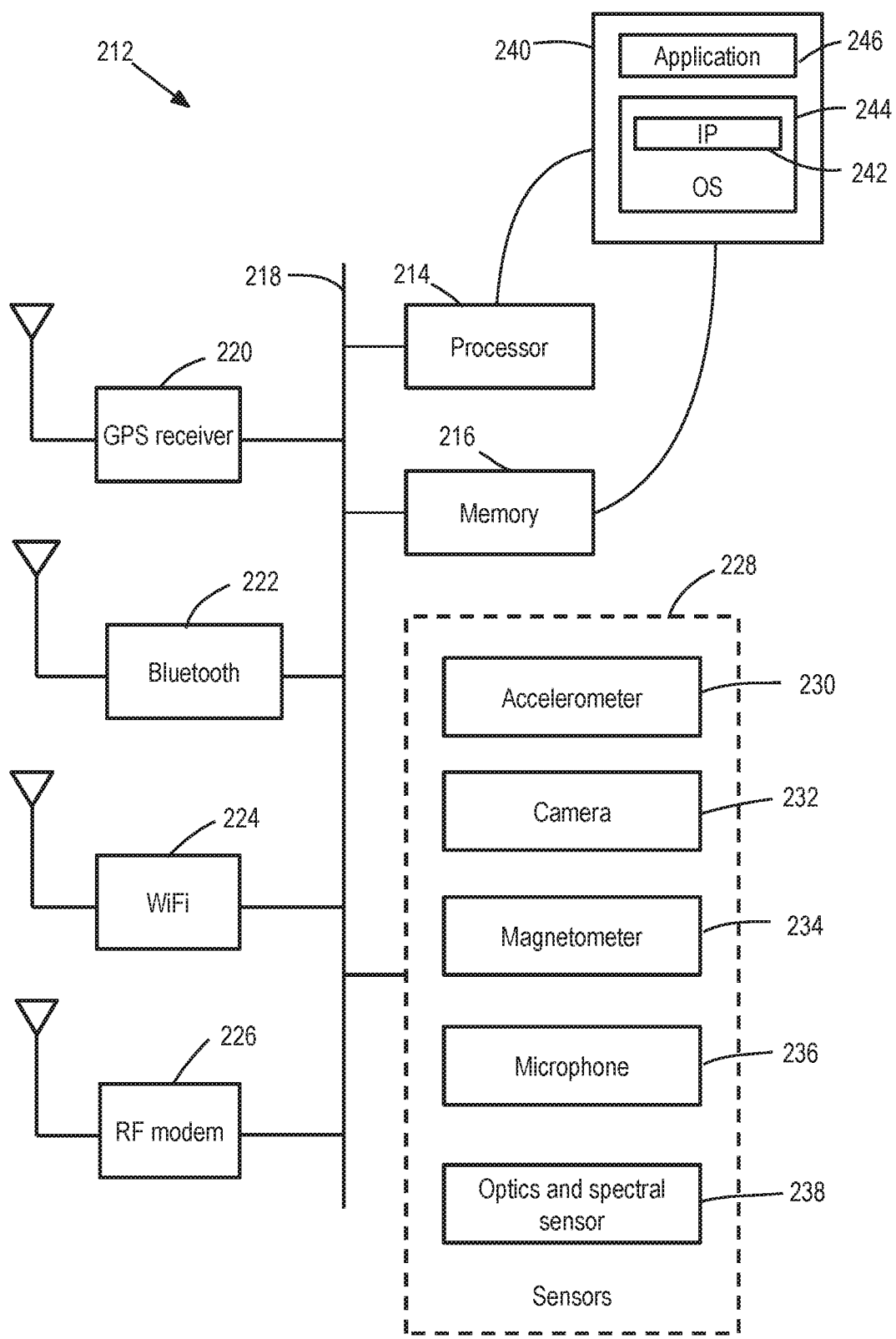
FIG. 17 depicts an exemplary communication device for implementing the conversation attendant and assistant platform, according to an exemplary embodiment.

Determining some aspects of a user context, such as whether the user is traveling by car or airplane, may be determined without user input by accessing information from the user's device, for example a smartphone. FIG. 17 illustrates an exemplary communication device 212 (e.g., such as the cellular telephone 54A of FIG. 1) in which embodiments may find application. The communication device 212 may be utilized, for example, as a cloud computing node 10 for implementing the conversation attendant and assistant platform 96. In the communication device 212, a programmable processor 214 is in communication with a memory 216 by way of a bus 218. The processor 214 may represent one or more processing cores fabricated on one or more chips. The memory 216 may represent a memory hierarchy comprising one or more levels of memory. The processor 214 also comprises memory, but such memory is not explicitly illustrated in FIG. 17. The communication device 212 further includes several modules coupled to the bus 218: a GPS (Global Positioning System) receiver 220, a BLUETOOTH transceiver 222, a WI-FI transceiver 224, and an RF (Radio Frequency) modem 226. Bluetooth is a registered trademark, owned by the Bluetooth SIG. Wi-Fi is a registered trademark, owned by the Wi-Fi Alliance Corporation. The Wi-Fi transceiver 224 may be in accordance with any one of several standards, such as for example the IEEE 802.11 standard.

The RF modem 226 may represent one or more RF antenna and modem systems for various types of RF communications, such as cellular phone communication according to the Long Term Evolution (LTE) standard, or near field communication, to name just two examples. The RF antenna may be a MIMO (Multiple-Input and Multiple-Output) antenna, for example.

A suite of sensors 228 comprises one or more sensors coupled to the bus 218, where the suite of sensors 228 may include, for example, an accelerometer 230, a camera 232, a magnetometer 234, a microphone 236, and an optics and spectral sensor 238. The optics and spectral sensor 238 may be similar to the camera 232, but fabricated to operate outside of the visible spectrum, or it may be fabricated to operate over one or more narrowband of frequencies to aid in proximity detection or other types of detection, such as facial detection.

During operation of the communication device 212, the device 212 loads software stored in the memory 216 and runs several processes based upon such stored software as well as perhaps firmware stored in the processor 214. In particular, various protocol stacks are implemented so that the communication device 212 can communicate over various networks with other devices, such as other cellular phones, landline phones, and servers. FIG. 17 illustrates a simplified view of a protocol stack 240 illustrating an operating system 242 in which one of the layers in the operating system 242 is an IP (Internet protocol) layer 244. The operating system 242 typically includes numerous other software layers, as will be appreciated by the skilled artisan given the teachings herein, omitted to avoid clutter.

FIG. 17 illustrates an application layer 246 above the IP layer 244. Data from the application layer 246, which may be termed a service data unit (SDU), is passed down to the IP layer 244 to be encapsulated into a protocol data unit (PDU), for example a TCP/IP packet. An application program (app) running in the application layer 246 may obtain signals from the suite of sensors 228 or the various receivers and transceiver modules 220, 222, 224, and 226. For example, an app may process signals from the GPS receiver 220 to determine if the user is likely traveling by car. Such information regarding the user context may be transmitted by TCP/IP packets to a remote server in which the user context is stored, or to a remote server in which an embodiment, or part of an embodiment, may be implemented, such as the conversation attendant and assistant platform 96 in FIG. 2.

Figure 18:
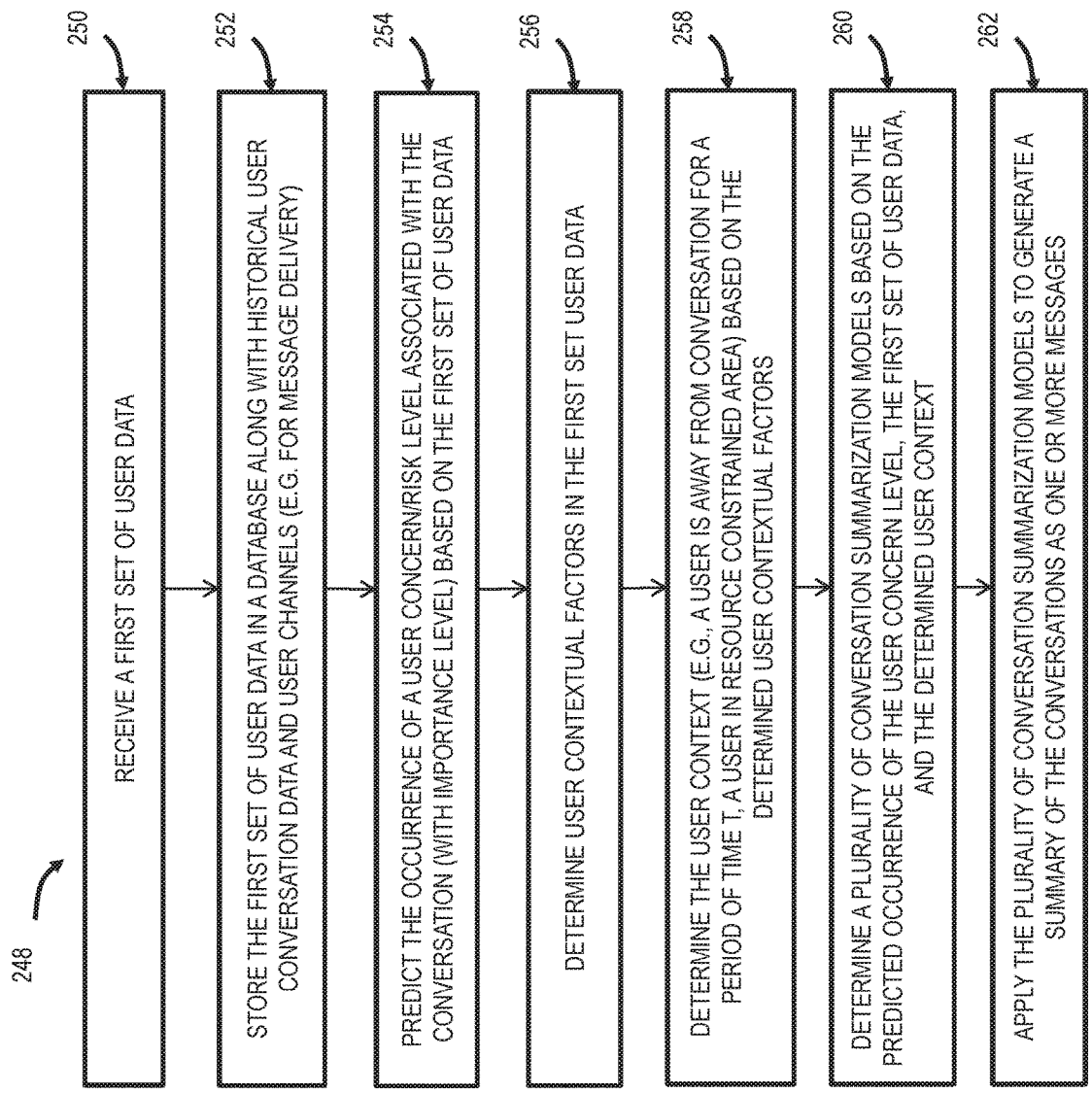
FIG. 18 depicts a method for learning how to summarize conversations within the conversation attendant and assistant platform, according to an exemplary embodiment.

Referring to FIG. 18, the platform 96 learns how to summarize conversations according to a method 248. At 250, the platform 96 receives a first set of user data. At 252, the platform 96 stores the first set of user data in a database along with historical user conversation data, user context, user channels (e.g., for message delivery) and other situational context data (e.g., work/task related context, time of the day context, etc.). At 254, the risk engine 116 predicts the occurrence of a user concern/risk level associated with the conversation (with importance level) based on the first set of user data. At 256, the summarization engine 122 determines user contextual factors in the first set of user data. At 258, the summarization engine 122 determines the user context for each message of the historical conversations (e.g., a user is away from conversation for a period of time T, a user in resource constrained area) based on the determined user contextual factors. At 260, the summarization engine 122 determines a plurality of conversation summarization models based on the predicted occurrence of the user concern level, the first set of user data, and the determined user context. At 262, the summarization engine 122 applies the plurality of conversation summarization models to generate a summary of the conversations as one or more messages.

Figure 19:
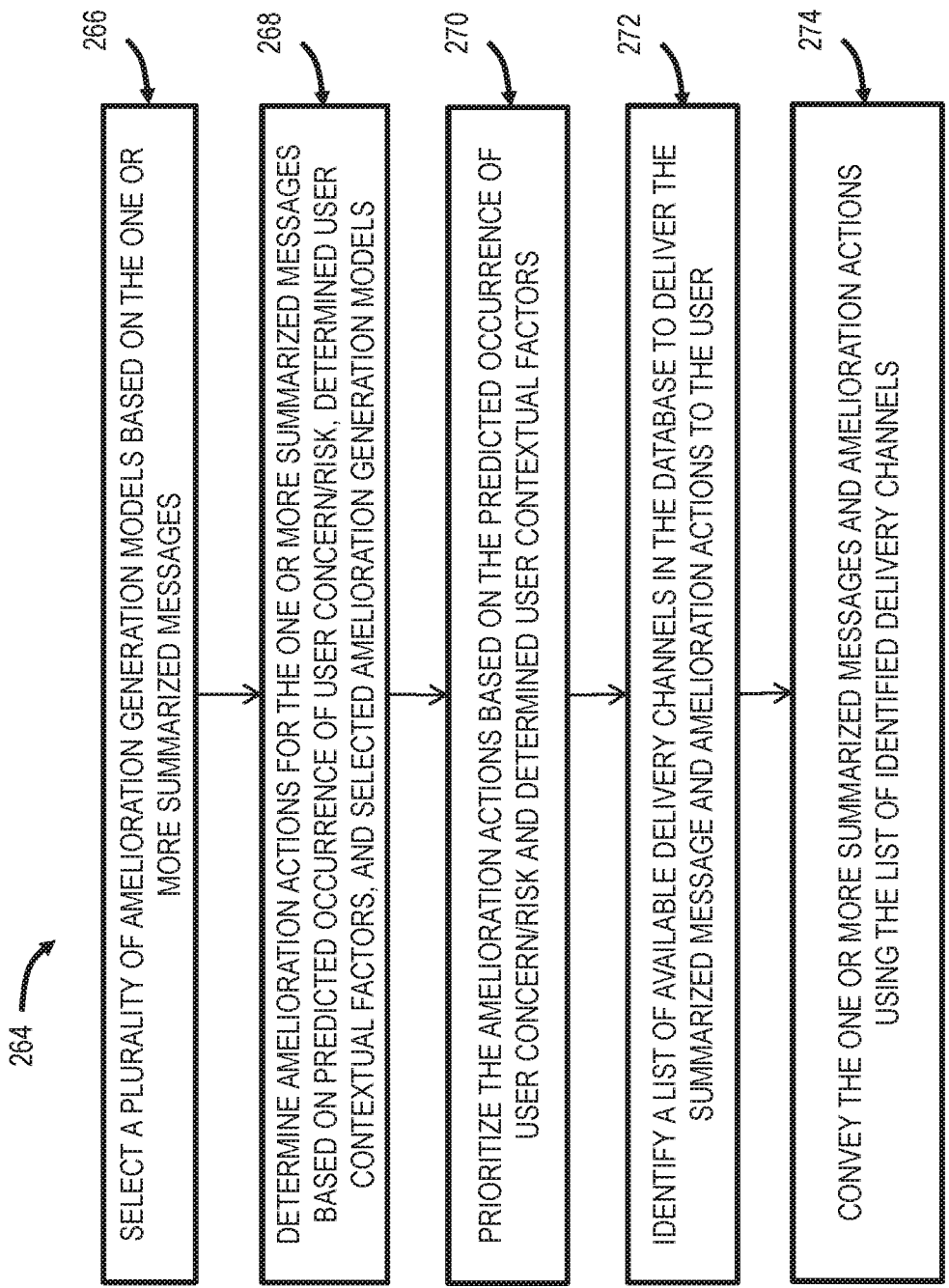
FIG. 19 depicts a method for learning how to tag messages with actions within the conversation attendant and assistant platform, according to an exemplary embodiment.

FIG. 19 depicts a method 264 by which the platform 96 learns how to tag messages with actions. At 266, the action tagging engine 118 selects a plurality of amelioration generation models based on one or more summarized messages. At 268, the action tagging engine 118 determines amelioration actions for the one or more summarized messages in response to predicted occurrence of user concern/risk, determined user contextual factors, and selected amelioration generation models. At 270, the prioritization engine 114 prioritizes the amelioration actions based on the predicted occurrence of user concern/risk and determined user contextual factors. At 272, the prioritization engine 114 identifies a list of available delivery channels in the database to deliver the summarized message and amelioration actions to the user. At 274, the prioritization engine 114 conveys the one or more summarized messages and amelioration actions using the list of identified delivery channels (messaging applications).

Given the discussion thus far, it will be appreciated that, in general terms, an exemplary method, according to an aspect of the invention, includes receiving by a computer a plurality of messages in a plurality of conversations via one or more messaging applications. One or more embodiments include tagging each message of the plurality of messages with a message cohort and an amelioration action. In response to the message cohort of a given message, the method includes assigning a risk to the given message. In one or more embodiments include determining a user context of a user of the computer, and, in response to factors including the user context of the user and the risk of the given message, assigning a concern level to the given message. Further, in at least one embodiment, the method includes accumulating and summarizing the given message along with other messages in a conversation of the given message; and, in case the concern level of the given message exceeds a threshold, selecting one or more delivery channels for surfacing a summary of the conversation of the given message and surfacing the summary via the one or more delivery channels. The method of one or more embodiments also includes delivering to the user a prompt to take an action associated with the given message. In response to the user selecting the prompt, the method includes implementing the action associated with the given message.

In one or more embodiments, tagging with a message cohort includes comparing, by natural language processing carried out by a neural network, each of the first group of messages to a corpus of prior messages already tagged with message cohorts.

In one or more embodiments, tagging with an amelioration action includes comparing, by natural language processing carried out by a neural network, each of the second group of messages to a corpus of prior messages already tagged with actions. In one or more embodiments, tagging with an amelioration action includes identifying in each of the second group of messages key words associated with actions in a dictionary of rules. One or more embodiments include learning the dictionary of rules by a neural network in a semi-supervised fashion from a corpus of messages associated with actions assigned by a user.

In one or more embodiments, determining a user context includes monitoring by the communications device whether the user is attending each of the plurality of conversations.

In one or more embodiments, summarizing the given message along with other messages includes drawing a flow chart of the conversation including the given message. In one or more embodiments, summarizing the given message along with other messages includes adding a follow up reminder to the user's electronic calendar.

One or more embodiments of the invention, or elements thereof, can be implemented in the form of an apparatus including a memory and at least one processor that is coupled to the memory and operative to perform exemplary method steps, or in the form of a non-transitory computer readable medium embodying computer executable instructions which when executed by a computer cause the computer to perform exemplary method steps.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving by a computer a plurality of messages in a plurality of conversations via one or more messaging applications;
   tagging with a message cohort each message of the plurality of messages;
   tagging with an amelioration action each message of the plurality of messages;
   assigning a risk to a given message in response to the message cohort of the given message;
   determining by the computer a user context of a user of the computer;
   assigning a concern level to the given message in response to factors including the user context of the user and the risk of the given message;
   accumulating and summarizing the given message along with other messages in a conversation of the given message;
   selecting one or more delivery channels for surfacing a summary of the conversation of the given message; and
   surfacing the summary via the one or more delivery channels upon the concern level of the given message exceeding a threshold.

2. The method of claim 1, further comprising:
   delivering to the user a prompt to take an action associated with the given message.

3. The method of claim 2, further comprising:
   implementing the action associated with the given message in response to the user selecting the prompt.

4. The method of claim 1, wherein tagging with a message cohort includes comparing, by natural language processing carried out by a neural network, each of the first group of messages to a corpus of prior messages already tagged with message cohorts.

5. The method of claim 1, wherein tagging with an amelioration action includes comparing, by natural language processing carried out by a neural network, each of the second group of messages to a corpus of prior messages already tagged with actions.

6. The method of claim 1, wherein tagging with an amelioration action includes identifying in each of the second group of messages key words associated with actions in a dictionary of rules.

7. The method of claim 6, further comprising learning the dictionary of rules by a neural network in a semi-supervised fashion from a corpus of messages associated with actions assigned by a user.

8. The method of claim 1, wherein determining a user context includes monitoring by the communications device whether the user is attending each of the plurality of conversations.

9. The method of claim 1, wherein summarizing the given message along with other messages includes drawing a flow chart of the conversation including the given message.

10. The method of claim 1, wherein summarizing the given message along with other messages includes adding a follow up reminder to the user's electronic calendar.

11. A non-transitory computer readable medium embodying computer executable instructions which when executed by a computer cause the computer to facilitate the method of:
receiving by the computer a plurality of messages in a plurality of conversations via one or more messaging applications;
tagging with a message cohort each message of the plurality of messages;
tagging with an amelioration action each message of the plurality of messages;
assigning a risk to a given message in response to the message cohort of the given message;
determining by the computer a user context of a user of the computer;
assigning a concern level to the given message in response to factors including the user context of the user and the risk of the given message;
accumulating and summarizing the given message along with other messages in a conversation of the given message;
selecting one or more delivery channels for surfacing a summary of the conversation of the given message; and
surfacing the summary via the one or more delivery channels upon the concern level of the given message exceeding a threshold.

12. The medium of claim 11, wherein the computer-executable instructions further comprise instructions for:
delivering to the user a prompt to take an action associated with the given message.

13. The medium of claim 12, wherein the computer-executable instructions further comprise instructions for:
implementing the action associated with the given message in response to the user selecting the prompt.

14. The medium of claim 11, wherein tagging with a message cohort includes comparing, by natural language processing carried out by a neural network, each of the first group of messages to a corpus of prior messages already tagged with message cohorts.

15. The medium of claim 11, wherein tagging with an amelioration action includes comparing, by natural language processing carried out by a neural network, each of the second group of messages to a corpus of prior messages already tagged with actions.

16. The medium of claim 11, wherein tagging with an amelioration action includes identifying in each of the second group of messages key words associated with actions in a dictionary of rules.

17. The medium of claim 16, wherein the computer-executable instructions further comprise instructions for:
learning the dictionary of rules by a neural network in a semi-supervised fashion from a corpus of messages associated with actions assigned by a user.

18. The medium of claim 11, wherein the instructions further comprise instructions for:
monitoring by the computer whether the user is attending each of the plurality of conversations.

19. An apparatus comprising:
a memory embodying computer executable instructions; and
at least one processor, coupled to the memory, and operative by the computer executable instructions to facilitate a method of:
receiving by the processor a plurality of messages in a plurality of conversations via one or more messaging applications;
tagging with a message cohort each message of the plurality of messages;
tagging with an amelioration action each message of the plurality of messages;
in response to the message cohort of a given message, assigning a risk to the given message;
determining by the processor a user context of a user of the apparatus;
in response to factors including the user context of the user and the risk of the given message, assigning a concern level to the given message;
accumulating and summarizing the given message along with other messages in a conversation of the given message;
selecting one or more delivery channels for surfacing a summary of the conversation of the given message; and
surfacing the summary via the one or more delivery channels upon the concern level of the given message exceeding a threshold.

20. The apparatus of claim 19, the processor further operative to facilitate:
delivering to the user a prompt to take an action associated with the given message.

* * * * *